(12) United States Patent
Bai et al.

(10) Patent No.: US 12,150,078 B2
(45) Date of Patent: Nov. 19, 2024

(54) PHASE TRACKING REFERENCE SIGNAL PATTERN SELECTION

(71) Applicant: QUALCOMM Incorporated, San Diego, CA (US)

(72) Inventors: Tianyang Bai, Somerville, NJ (US); Wooseok Nam, San Diego, CA (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 745 days.

(21) Appl. No.: 17/231,519

(22) Filed: Apr. 15, 2021

(65) Prior Publication Data

US 2021/0329582 A1 Oct. 21, 2021

Related U.S. Application Data

(60) Provisional application No. 63/011,695, filed on Apr. 17, 2020.

(51) Int. Cl.
*H04W 56/00* (2009.01)
*H04L 5/00* (2006.01)
*H04L 7/04* (2006.01)
*H04W 72/0446* (2023.01)

(52) U.S. Cl.
CPC ....... *H04W 56/0035* (2013.01); *H04L 5/0048* (2013.01); *H04L 7/042* (2013.01); *H04W 72/0446* (2013.01)

(58) Field of Classification Search
CPC .......... H04W 56/0035; H04W 72/0446; H04L 5/0048; H04L 5/0094; H04L 7/042; H04L 27/2636; H04L 27/26526; H04L 27/2613
See application file for complete search history.

(56) References Cited

U.S. PATENT DOCUMENTS

| | | | |
|---|---|---|---|
| 10,972,238 B2 * | 4/2021 | Zhang | H04W 72/0446 |
| 11,108,605 B2 * | 8/2021 | Zhang | H04J 13/004 |
| 2018/0337804 A1 * | 11/2018 | Esch | H04L 25/03133 |
| 2019/0319719 A1 * | 10/2019 | McGowan | H01Q 3/267 |
| 2020/0008228 A1 * | 1/2020 | Lee | H04L 5/001 |
| 2020/0052944 A1 * | 2/2020 | Zhang | H04L 5/0048 |
| 2020/0076647 A1 * | 3/2020 | Zhang | H04L 5/001 |
| 2020/0127776 A1 * | 4/2020 | Maki | H04L 25/03 |
| 2021/0105122 A1 * | 4/2021 | Xiong | H04L 5/0051 |
| 2022/0085940 A1 * | 3/2022 | Xiong | H04L 5/0053 |
| 2022/0094496 A1 * | 3/2022 | Xiong | H04W 72/0446 |
| 2022/0116252 A1 * | 4/2022 | Xiong | H04L 27/2607 |
| 2022/0166565 A1 * | 5/2022 | Maki | H04L 25/0224 |

* cited by examiner

*Primary Examiner* — Redentor Pasia
(74) *Attorney, Agent, or Firm* — Holland & Hart LLP

(57) ABSTRACT

Methods, systems, and devices for wireless communications are described. A user equipment (UE) may select a candidate pattern from a set of patterns for reference signals used to track phase error. The UE may transmit an indication of the selected pattern to a base station and receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group. The UE may receive the reference signals used to track phase error according to the indicated configuration.

29 Claims, 17 Drawing Sheets

PHASE TRACKING REFERENCE SIGNAL PATTERN SELECTION

CROSS REFERENCE

The present Application for Patent claims the benefit of U.S. Provisional Patent Application No. 63/011,695 by Bai et al., entitled "PHASE TRACKING REFERENCE SIGNAL PATTERN SELECTION," filed Apr. 17, 2020, assigned to the assignee hereof, and expressly incorporated by reference herein.

FIELD OF TECHNOLOGY

The present disclosure relates to wireless communications and more specifically to phase tracking reference signal pattern selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may transmit data symbols to a base station. In some cases, reference symbols may be transmitted among the data symbols, however some reference symbol patterns may suffer from high error magnitudes.

SUMMARY

The described techniques relate to improved methods, systems, devices, and apparatuses that support pattern selection for reference signals used to track phase error (e.g., phase tracking reference signals (PTRSs)). Generally, the described techniques provide for improving link quality and data throughput between a user equipment (UE) and a base station. The reference signals used to track phase error (e.g., phase tracking reference signals (PTRSs)) may be transmitted according to a reference signal pattern, and the reference signals may be used to estimate an error. In some cases, phase compensation may be applied based on the estimated error, which may improve link quality or data throughput, or both. A UE may select a candidate pattern from a set of patterns for reference signals used to track phase error, and the UE may transmit an indication of the selected pattern to a base station. In some cases, the candidate pattern may be based on a receiver type (e.g., a time domain equalization (TDE) receiver, a frequency domain equalization (FDE) receiver, among other examples), an amount of phase noise measured at the UE, or any combination thereof.

The base station may determine a configuration for the PTRSs used to track phase error based on the candidate pattern and may transmit an indication of the configuration to the UE. In some examples, the base station may determine a configuration to be in accordance with the candidate pattern, while in other cases, the base station may determine the configuration to be in opposition with the candidate pattern. The UE may receive, from the base station, the indication of the configuration for the reference signals used to track phase error, the configuration indicating a pattern of the set of patterns, a number of reference signal groups, and a number of samples per reference signal group. The UE may, in some cases, receive the reference signals used to track phase error according to the indicated configuration.

A method of wireless communication at a UE is described. The method may include selecting a candidate pattern from a set of patterns for reference signals used to track phase error, transmitting, to a base station, an indication of the selected pattern, receiving, from the base station at least in part in response to the transmitted indication of the selected pattern, an indication of a configuration for the reference signals used to track phase error, the configuration indicating a pattern of the set of patterns, a number of reference signal groups, and a number of samples per reference signal group, and receiving, according to the indicated configuration, the reference signals used to track phase error.

An apparatus for wireless communication at a UE is described. The apparatus may include a processor, memory coupled with the processor, and instructions stored in the memory. The instructions may be executable by the processor to cause the apparatus to select a candidate pattern from a set of patterns for reference signals used to track phase error, transmit, to a base station, an indication of the selected pattern, receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group, and receive, according to the indicated configuration, the reference signals used to track phase error.

Another apparatus for wireless communication at a UE is described. The apparatus may include means for selecting a candidate pattern from a set of patterns for reference signals used to track phase error, transmitting, to a base station, an indication of the selected pattern, receiving, from the base station at least in part in response to the transmitted indication of the selected pattern, an indication of a configuration for the reference signals used to track phase error, the configuration indicating a pattern of the set of patterns, a number of reference signal groups, and a number of samples per reference signal group, and receiving, according to the indicated configuration, the reference signals used to track phase error.

A non-transitory computer-readable medium storing code for wireless communication at a UE is described. The code may include instructions executable by a processor to select a candidate pattern from a set of patterns for reference signals used to track phase error, transmit, to a base station, an indication of the selected pattern, receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group, and receive, according to the indicated configuration, the reference signals used to track phase error.

In some examples of the method, apparatuses, and non-transitory computer-readable medium described herein, the set of patterns may include operations, features, means, or instructions for the first pattern includes a set of reference signal portions for the reference signals and at least one data portion, the set of reference signal portions bounding the at least one data portion in a time domain, and the second pattern includes a set of data portions and at least one reference signal portion for the reference signals, the set of data portions bounding the at least one reference signal portion in the time domain.

In some examples of the method, apparatuses, and non-transitory computer-readable medium described herein, the first pattern and the second pattern both include at least one of the same number of reference signal samples, or the same number of reference signal groups, or the same number of samples per group.

In some examples of the method, apparatuses, and non-transitory computer-readable medium described herein, selecting the candidate pattern further may include operations, features, means, or instructions for identifying an equalizer including a frequency domain equalizer or a time domain equalizer, and selecting the candidate pattern based on the identified equalizer.

In some examples of the method, apparatuses, and non-transitory computer-readable medium described herein, the candidate pattern includes a first pattern and the equalizer includes a time domain equalizer, where the first pattern includes a set of reference signal portions for the reference signals and at least one data portion, the set of reference signal portions bounding the at least one data portion in a time domain.

In some examples of the method, apparatuses, and non-transitory computer-readable medium described herein, the candidate pattern includes a second pattern and the equalizer includes a frequency domain equalizer, where the second pattern includes a set of data portions and at least one reference signal portion for the reference signals, the set of data portions bounding the at least one reference signal portion in a time domain.

In some examples of the method, apparatuses, and non-transitory computer-readable medium described herein, the indication of the configuration for the reference signals used to track phase error indicates a table entry that identifies the pattern of the set of patterns, the number of reference signal groups, and the number of samples per reference signal group.

In some examples of the method, apparatuses, and non-transitory computer-readable medium described herein, the indication of the configuration for the reference signals used to track phase error indicates the pattern of the set of patterns, and indicates a table entry that identifies the number of reference signal groups and the number of samples per reference signal group.

Some examples of the method, apparatuses, and non-transitory computer-readable medium described herein may further include operations, features, means, or instructions for identifying a receiver capability of the UE, and selecting the candidate pattern based on the identified receiver capability.

Some examples of the method, apparatuses, and non-transitory computer-readable medium described herein may further include operations, features, means, or instructions for identifying a receiver capability of the UE, and transmitting, to the base station, an indication of the receiver capability of the UE, where the indication of the configuration may be received from the base station at least in part in response to the transmitted indication of the receiver capability.

In some examples of the method, apparatuses, and non-transitory computer-readable medium described herein, selecting the candidate pattern further may include operations, features, means, or instructions for measuring phase noise at the UE, and selecting the candidate pattern based on the measured phase noise.

Some examples of the method, apparatuses, and non-transitory computer-readable medium described herein may further include operations, features, means, or instructions for identifying a receiver implementation of the UE, and selecting the candidate pattern based on the identified receiver implementation.

Some examples of the method, apparatuses, and non-transitory computer-readable medium described herein may further include operations, features, means, or instructions for performing a transmission over a radio frequency spectrum band, and measuring a phase error of the transmission based on the indication of the configuration for the reference signals used to track phase error.

Some examples of the method, apparatuses, and non-transitory computer-readable medium described herein may further include operations, features, means, or instructions for identifying a mode of operation for the UE, identifying a first set of configurations for the reference signals used to track phase error corresponding to a first mode of operation and a second set of configurations for the reference signals used to track phase error corresponding to a second mode of operation different than the first mode of operation, determining one of the first set of configurations or the second set of configurations corresponding to the identified mode of operation for the UE, and determining the configuration for the reference signal used to track phase error based on the received indication of the configuration and the determined one of the first set of configurations or the second set of configurations.

Some examples of the method, apparatuses, and non-transitory computer-readable medium described herein may further include operations, features, means, or instructions for receiving, from the base station, the first set of configurations corresponding to the first mode of operation and the second set of configurations corresponding to the second mode of operation.

In some examples of the method, apparatuses, and non-transitory computer-readable medium described herein, the first mode of operation corresponds to an initial access procedure using a first bandwidth, and the second mode of operation corresponds to procedures following the initial access procedure using a second bandwidth narrower than the first bandwidth.

A method of wireless communication at a base station is described. The method may include receiving, from a UE, an indication of a candidate reference signal pattern, the candidate reference signal pattern indicating one of a set of patterns for reference signals used to track phase error, determining, based on the indicated candidate reference signal pattern, a configuration for the reference signals used to track phase error, the configuration indicating a pattern of a set of patterns, a number of reference signal groups, and a number of samples per reference signal group, transmitting, to the UE, an indication of the configuration, and transmitting, according to the indicated configuration, the reference signals used to track phase error.

An apparatus for wireless communication at a base station is described. The apparatus may include a processor, memory coupled with the processor, and instructions stored in the memory. The instructions may be executable by the processor to cause the apparatus to receive, from a UE, an indication of a candidate reference signal pattern, the candidate reference signal pattern indicating one of a set of patterns for reference signals used to track phase error, determine, based on the indicated candidate reference signal pattern, a configuration for the reference signals used to track phase error, the configuration indicating a pattern of a set of patterns, a number of reference signal groups, and a number of samples per reference signal group, transmit, to the UE, an indication of the configuration, and transmit, according to the indicated configuration, the reference signals used to track phase error.

Another apparatus for wireless communication at a base station is described. The apparatus may include means for receiving, from a UE, an indication of a candidate reference signal pattern, the candidate reference signal pattern indicating one of a set of patterns for reference signals used to track phase error, determining, based on the indicated candidate reference signal pattern, a configuration for the reference signals used to track phase error, the configuration indicating a pattern of a set of patterns, a number of reference signal groups, and a number of samples per reference signal group, transmitting, to the UE, an indication of the configuration, and transmitting, according to the indicated configuration, the reference signals used to track phase error.

A non-transitory computer-readable medium storing code for wireless communication at a base station is described. The code may include instructions executable by a processor to receive, from a UE, an indication of a candidate reference signal pattern, the candidate reference signal pattern indicating one of a set of patterns for reference signals used to track phase error, determine, based on the indicated candidate reference signal pattern, a configuration for the reference signals used to track phase error, the configuration indicating a pattern of a set of patterns, a number of reference signal groups, and a number of samples per reference signal group, transmit, to the UE, an indication of the configuration, and transmit, according to the indicated configuration, the reference signals used to track phase error.

In some examples of the method, apparatuses, and non-transitory computer-readable medium described herein, the set of patterns may include operations, features, means, or instructions for the first pattern includes a set of reference signal portions for the reference signals and at least one data portion, the set of reference signal portions bounding the at least one data portion in a time domain, and the second pattern includes a set of data portions and at least one reference signal portion for the reference signals, the set of data portions bounding the at least one reference signal portion in the time domain.

In some examples of the method, apparatuses, and non-transitory computer-readable medium described herein, the set of patterns includes at least a first pattern and a second pattern, where the first pattern and the second pattern both include at least one of the same number of reference signal samples, or the same number of reference signal groups, or the same number of samples per group.

In some examples of the method, apparatuses, and non-transitory computer-readable medium described herein, the candidate reference signal pattern may be based on an equalizer, where the equalizer includes a frequency domain equalizer or a time domain equalizer.

In some examples of the method, apparatuses, and non-transitory computer-readable medium described herein, the candidate reference signal pattern includes a first pattern and the equalizer includes a time domain equalizer, where the first pattern includes a set of reference signal portions for the reference signals and at least one data portion, the set of reference signal portions bounding the at least one data portion in a time domain.

In some examples of the method, apparatuses, and non-transitory computer-readable medium described herein, the candidate reference signal pattern includes a second pattern and the equalizer includes a frequency domain equalizer, where the second pattern includes a set of data portions and at least one reference signal portion for the reference signals, the set of data portions bounding the at least one reference signal portion in a time domain.

In some examples of the method, apparatuses, and non-transitory computer-readable medium described herein, the configuration for the reference signals used to track phase error indicates a table entry that identifies the pattern of the set of patterns, the number of reference signal groups, and the number of samples per reference signal group.

In some examples of the method, apparatuses, and non-transitory computer-readable medium described herein, the configuration for the reference signals used to track phase error indicates the pattern of the set of patterns, and indicates a table entry that identifies the number of reference signal groups and the number of samples per reference signal group.

Some examples of the method, apparatuses, and non-transitory computer-readable medium described herein may further include operations, features, means, or instructions for receiving an indication of a receiver capability of the UE, and transmitting the indication of the configuration to the UE based on the received indication of the receiver capability.

Some examples of the method, apparatuses, and non-transitory computer-readable medium described herein may further include operations, features, means, or instructions for transmitting, to the UE, a first set of configurations corresponding to a first mode of operation for the UE and a second set of configurations corresponding to a second mode of operation for the UE.

In some examples of the method, apparatuses, and non-transitory computer-readable medium described herein, the first mode of operation corresponds to an initial access procedure using a first bandwidth, and the second mode of operation corresponds to procedures following the initial access procedure using a second bandwidth narrower than the first bandwidth.

DETAILED DESCRIPTION

Wireless communications systems are widely deployed to provide various types of communication content such as voice, video, packet data, messaging, broadcast, and so on. A (UE) may support frequency domain equalization (FDE), time domain equalization (TDE), or a combination thereof, and the UE may communicate with a base station according to a pattern of reference signals used to track phase error (e.g., phase tracking reference signals (PTRSs)) inserted among data symbols). In some cases, the UE may suggest a reference signal pattern (e.g., a candidate reference pattern) and receive an indication of a selected reference pattern from the base station. The selected reference pattern may be based on the suggested reference signal pattern, and the UE and the base station may communicate based on the selected reference pattern.

Some reference signal patterns may be associated with higher error vector magnitudes (EVMs), which may degrade link quality between the UE and the base station. In some cases, a head tale (HT) reference signal pattern may be associated with higher EVM. A UE may suggest a candidate reference signal pattern based on a type of equalization, and the suggested reference signal pattern may improve link quality. For example, the UE may suggest an HT pattern based on a TDE receiver and a non-head tale (Non-HT) pattern based on an FDE receiver.

The UE may suggest a candidate reference signal pattern to the base station, receive a reference signal pattern from the base station, and communicate with the base station based on the received reference signal pattern. In some cases, the base station may configure the UE (e.g., during a radio resource control (RRC) procedure) with a table (e.g., a data symbol mapping table), and the UE and the base station may communicate based on the table. In some additional or alternative cases, the base station may configure the UE with an initial table as well as a secondary table, and the UE and the base station may initially communicate based on the initial table and subsequently communicate based on the secondary table. Communicating based on a reference signal pattern and communicating based on an initial table and a secondary table may improve link quality and data throughput.

Aspects of the disclosure are initially described in the context of wireless communications systems. Aspects of the disclosure are then described with reference to an additional wireless communications system, a TDE process flow, an FDE process flow, and an additional process flow. Aspects of the disclosure are further illustrated by and described with reference to apparatus diagrams, system diagrams, and flowcharts that relate to phase tracking reference signal pattern selection.

Figure 1:
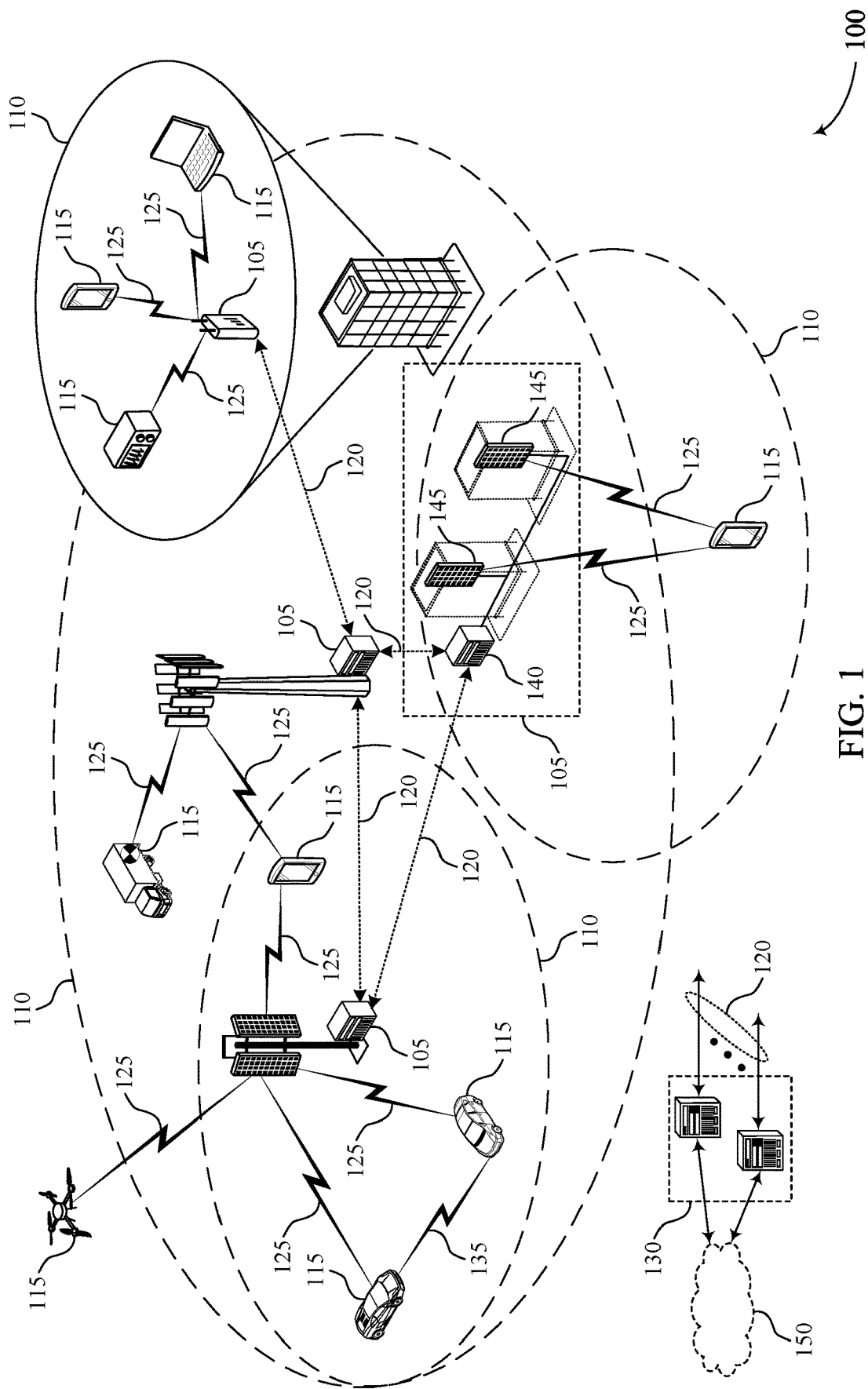
FIG. 1 illustrates an example of a system for wireless communications that supports phase tracking reference signal pattern selection in accordance with aspects of the present disclosure.

FIG. 1 illustrates an example of a wireless communications system 100 that supports phase tracking reference signal pattern selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with a base station 105 according to a reference signal pattern. In some cases, the UE 115 may transmit a candidate reference signal pattern to the base station 105, and the base station 105 may choose the reference signal pattern based on the candidate reference signal pattern. The UE may receive data symbols and reference signals. The UE may receive the reference symbols according to the reference signal pattern, estimate error based on the received reference signals, and apply a phase compensation to the received data symbols, thereby reducing phase noise and improving link quality.

Figure 2:
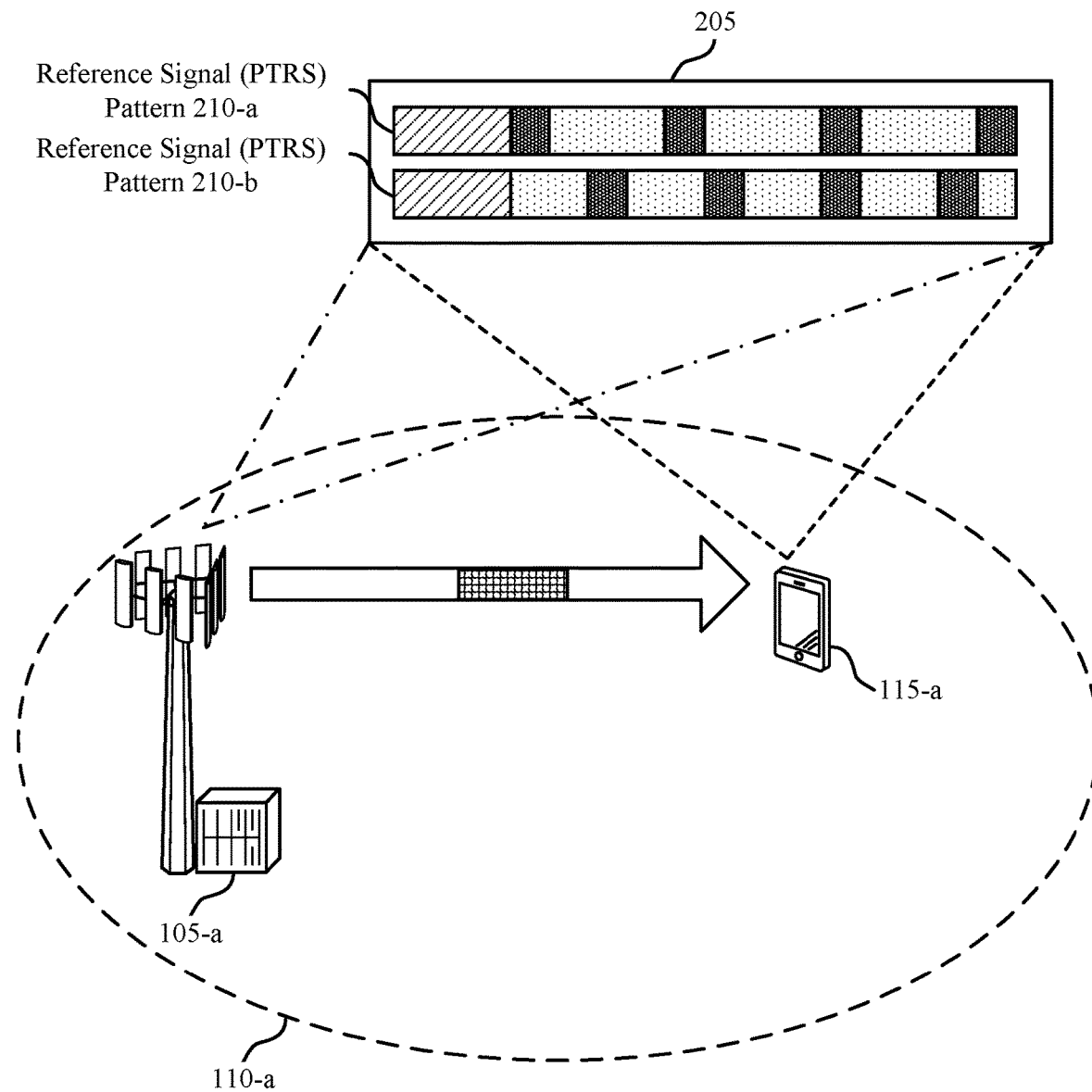
FIG. 2 illustrates an example of a wireless communications system that supports phase tracking reference signal pattern selection in accordance with aspects of the present disclosure.

FIG. 2 illustrates an example of a wireless communications system 200 that supports phase tracking reference signal pattern selection in accordance with aspects of the present disclosure. In some examples, wireless communications system 200 may implement aspects of wireless communications system 100. Wireless communications system 200 may include UE 115-a which may be an example of a UE 115 as described with respect to FIG. 1 and base station 105-a which may be an example of a base station 105 as described with respect to FIG. 1. Base station 105-a may transmit or configure UE 115-a with symbol mapping information 205. The symbol mapping information 205 may include a set of reference signal patterns (which may also be referred to as reference signal insertion patterns, for example PTRS insertion patterns) including at least a reference signal pattern 210-a and a reference signal pattern 210-b. In other examples more than two reference signal patterns 210 may be used according to the techniques described herein. Reference signal patterns 210-a and 210-b may include a number of reference signals 215, a number of data symbols 220, and a number of cyclic prefixes 225.

In some examples, reference signal pattern 210-a may be referred to as a HT reference signal pattern (e.g., an HT reference signal insertion pattern, or HT PTRS insertion pattern), where the data portions for data symbols 220 of the reference signal pattern 210-a are bounded by the reference signal portions for reference signals 215 of the reference signal pattern 210-a. In the example of reference signal pattern 210-a, there are four instances of reference signal portions of reference signals 215, and three instances of data portions for data symbols 220. In other examples, other numbers of reference signal portions that bound the data portions may be used consistent with the techniques described herein. For example, two instances of reference signal portions and one instance of a data portion; three instances of reference signal portions and two instances of data portions; five instances of reference signal portions and four instances of data portions; and so on.

In some examples, reference signal pattern 210-b may be referred to as a non-HT reference signal pattern (e.g., a non-HT reference signal insertion pattern, or non-HT PTRS insertion pattern), where the reference signal portions for reference signals 215 of the reference signal pattern 210-a are bounded by the data portions for data symbols 220 of the reference signal pattern 210-b. In the example of reference signal pattern 210-b, there are three instances of reference signal portions of reference signals 215, and four instances of data portions for data symbols 220. In other examples, other numbers of reference signal portions that are bounded the data portions may be used consistent with the techniques described herein. For example, one instance of a reference signal portion and two instances of the data portions; two instances of reference signal portions and three instances of data portions; four instances of reference signal portions and five instances of data portions; and so on.

Though HT and non-HT are used as examples of reference signal pattern 210-a and reference signal pattern 210-b, other patterns of reference signals and data may be used consistent with the techniques described herein. For example, more than two different reference signal patterns may be used. Additionally or alternatively, one or more reference signal patterns 210 may include portions in addition to the reference signal used to track phase error and data, such as portions for different types of reference signals or control (e.g., control messages (such as MAC-CE or other control above the physical layer), feedback (such as HARQ-ACK feedback based on uplink messages), etc.).

UE 115-a may communicate with base station 105-a based on the symbol mapping information 205, and base station 105-a may indicate the symbol mapping information 205 to UE 115-a during a control procedure (e.g., a radio resource control (RRC) procedure). The symbol mapping information 205 may include a number of reference signal patterns 210 (e.g., an HT pattern, a non-HT pattern, etc.) for the reference signals used to track phase error (e.g., a PTRS), a number of reference signal groups, or a number of samples per reference signal group, or a combination of these. In some cases, base station 105-a may transmit or configure UE 115-a with a first symbol mapping information 205 and a second symbol mapping information 205. UE 115-a may, for example, communicate with base station 105-a based on the first symbol mapping information 205 for initial access (such as during a procedure for establishing or re-establishing an RRC connection) and based on the second symbol mapping information 205 for non-initial access. Communicating based on the second symbol mapping information 205 may increase data rate and throughput, thereby reducing latency of wireless communications system 200.

Symbol mapping information 205 may be based on a suggested reference signal pattern (e.g., a candidate pattern, a candidate reference signal pattern, candidate PTRS pattern, etc.). For example, UE 115-as may transmit a suggested reference signal pattern to base station 105-a, and base station 105-a may transmit the symbol mapping information 205 to UE 115-a based on the suggested reference signal pattern. UE 115-a may indicate a suggested reference signal pattern for a symbol mapping table, a reference signal pattern for a subset of the symbol mapping table, a number of reference signal patterns for the symbol mapping table, a number of reference signal patterns for a subset of the symbol mapping table, or any combination thereof. In some cases, the suggested pattern may be based on a receiver type of UE 115-a (e.g., a TDE receiver, an FDE receiver, etc.) and/or an amount of phase noise. For example, UE 115-a may measure an amount of phase noise and suggest a first reference signal pattern if the measured phase noise meets or exceeds a threshold (e.g., a predetermined threshold), and UE 115-a may suggest a second reference signal pattern if the measured phase noise does not meet the threshold (e.g., the predetermined threshold).

Base station 105-a may configure UE 115-a with a symbol mapping table, and the symbol mapping table may include or be based on the symbol mapping information 205. The symbol mapping table may be based on the UE's configuration (e.g., a configured modulation and coding scheme (MCS) and a bandwidth). In some cases, UE 115-a may be configured with a symbol mapping table as part of an RRC configuration (e.g., during an RRC establishment or re-establishment procedure). The symbol mapping table may incorporate symbol mapping information 205, such that, for a particular number of reference signal groups $$(N_{group}^{PTRS})$$

(which in some cases may also be referred to as a number of chunks) and a number of samples per reference signal groups $$(N_{sample}^{group})$$

(which in some cases may also be referred to as a chunk size), UE 115-a may be configured to use one of reference signal pattern 210-a or reference signal pattern 210-b of symbol mapping information 205.

The symbol mapping information 205 may be based on the reference signal pattern suggested by UE 115-a to base station 105-a. In some examples, and the symbol mapping information 205 (e.g., reference signal pattern 210-a, reference signal pattern 210-b) may correspond to an indication in a column of the symbol mapping table. In other examples, the symbol mapping information 205 may correspond to an indication provided by rows of the symbol mapping table. In some examples, the symbol mapping information 205 may associate a number of rows of the symbol mapping table may be associated with a first reference signal pattern (e.g., reference signal pattern 210-a), and a number of rows of the symbol mapping table may be associated with a second reference signal pattern (e.g., reference signal pattern 210-b). In some examples, the symbol mapping information 205 may associate a subset of the symbol mapping table with a reference signal table. For example, the symbol mapping information 205 may associate the symbol mapping table (e.g., all rows or a subset of rows) with reference signal pattern 210-a (e.g., a HT pattern) or reference signal pattern 210-b (e.g., a Non-HT pattern) or a combination of reference signal pattern 210-a and reference signal pattern 210-b.

In an example of the additional column of the symbol mapping table, the additional column may indicate a reference signal pattern (e.g., a bit value representing a HT pattern or a Non-HT pattern) for a number of rows (e.g., each row of the table, a subset of the rows of the table, etc.) of the table. A UE may suggest a reference signal pattern for one or more (or all) of the configurations indicated in the symbol mapping table. For example, base station 105-a may transmit an indication of a reference signal pattern to UE 115-a, and UE 115-a may communicate with base station 105-a based on the reference signal pattern and the symbol mapping table (e.g., Table 1). The base station 105-a may also communication an indication of the number of reference signal groups and number of samples per reference signal group. In some examples, the reference signal pattern may be associated with one or more (or all) of the configurations indicated in the symbol mapping table. The symbol mapping table may then be used, for example together with the reference signal pattern suggested by the UE for communications with the base station 105-a. Table 1 illustrates an example symbol mapping table.

TABLE 1

| Number of Reference Signal Groups | Number of Samples per Reference Signal Group | Index m of Reference Signal Samples in OFDM Symbol l. Prior to Transform Precoding |
|---|---|---|
| 2 | 2 | $\lfloor sM_{sc}^{PUSCH}/4 \rfloor + k - 1$ where $s = 1, 3$ and $k = 0, 1$ |
| 2 | 4 | $sM_{sc}^{PUSCH} + k$ where $\begin{cases} s = 0 \text{ and } k = 0, 1, 2, 3 \\ s = 1 \text{ and } k = -4, -3, -2, -1 \end{cases}$ |
| 4 | 2 | $\lfloor sM_{sc}^{PUSCH}/8 \rfloor + k - 1$ where $s = 1, 3, 5, 7$ and $k = 0, 1$ |

TABLE 1-continued

| Number of Reference Signal Groups | Number of Samples per Reference Signal Group | Index m of Reference Signal Samples in OFDM Symbol l. Prior to Transform Precoding |
|---|---|---|
| 4 | 4 | $sM_{sc}^{PUSCH}/4 + n + k$ where $\begin{cases} s = 0 \text{ and } k = 0, 1, 2, 3 \; n = 0 \\ s = 1, 2 \text{ and } k = -2, -1, 0, 1 \; n = \lfloor M_{sc}^{PUSCH}/8 \rfloor \\ s = 4 \text{ and } k = -4, -3, -2, -1 \; n = 0 \end{cases}$ |
| 8 | 4 | $\lfloor sM_{sc}^{PUSCH}/8 \rfloor + n + k$ where $\begin{cases} s = 0 \text{ and } k = 0, 1, 2, 3 \; n = 0 \\ s = 1, 2, 3, 4, 5, 6 \text{ and } k = -2, -1, 0, 1 \; n = \lfloor M_{sc}^{PUSCH}/16 \rfloor \\ s = 8 \text{ and } k = -4, -3, -2, -1 \; n = 0 \end{cases}$ |

As illustrated in Table 2, rows of the symbol mapping table may indicate a reference signal pattern for one or more (or all) of the configurations indicated in the symbol mapping table. In some cases, a reference signal pattern may indicate a manner in which reference symbols (e.g., PTRSs) are inserted among data symbols.

TABLE 2

| 1. Number of Reference Signal Groups | Number of Samples per Reference Signal Group | Reference Signal Pattern | Index m of Reference Signal Samples in OFDM Symbol I. Prior to Transform Precoding |
|---|---|---|---|
| 2 | 2 | Head Tail | $\lfloor sM_{sc}^{PUSCH}/4 \rfloor + k - 1$ where $s = 1, 3$ and $k = 0, 1$ |
| 2 | 2 | Non-Head Tail | $\lfloor sM_{sc}^{PUSCH}/4 \rfloor + k - 1$ where $s = 1, 3$ and $k = 0, 1$ |
| 2 | 4 | Head Tail | $sM_{sc}^{PUSCH} + k$ where $\begin{cases} s = 0 \text{ and } k = 0, 1, 2, 3 \\ s = 1 \text{ and } k = -4, -3, -2, -1 \end{cases}$ |
| 2 | 4 | Non-Head Tail | $sM_{sc}^{PUSCH} + k$ where $\begin{cases} s = 0 \text{ and } k = 0, 1, 2, 3 \\ s = 1 \text{ and } k = -4, -3, -2, -1 \end{cases}$ |
| 4 | 2 | Head Tail | $\lfloor sM_{sc}^{PUSCH}/8 \rfloor + k - 1$ where $s = 1, 3, 5, 7$ and $k = 0, 1$ |
| 4 | 2 | Non-Head Tail | $\lfloor sM_{sc}^{PUSCH}/8 \rfloor + k - 1$ where $s = 1, 3, 5, 7$ and $k = 0, 1$ |
| 4 | 4 | Head Tail | $sM_{sc}^{PUSCH}/4 + n + k$ where $\begin{cases} s = 0 \text{ and } k = 0, 1, 2, 3 \; n = 0 \\ s = 1, 2 \text{ and } k = -2, -1, 0, 1 \; n = \lfloor M_{sc}^{PUSCH}/8 \rfloor \\ s = 4 \text{ and } k = -4, -3, -2, -1 \; n = 0 \end{cases}$ |
| 4 | 4 | Non-Head Tail | $sM_{sc}^{PUSCH}/4 + n + k$ where $\begin{cases} s = 0 \text{ and } k = 0, 1, 2, 3 \; n = 0 \\ s = 1, 2 \text{ and } k = -2, -1, 0, 1 \; n = \lfloor M_{sc}^{PUSCH}/8 \rfloor \\ s = 4 \text{ and } k = -4, -3, -2, -1 \; n = 0 \end{cases}$ |
| 8 | 4 | Head Tail | $\lfloor sM_{sc}^{PUSCH}/8 \rfloor + n + k$ where $\begin{cases} s = 0 \text{ and } k = 0, 1, 2, 3 \; n = 0 \\ s = 1, 2, 3, 4, 5, 6 \text{ and } k = -2, -1, 0, 1 \; n = \lfloor M_{sc}^{PUSCH}/16 \rfloor \\ s = 8 \text{ and } k = -4, -3, -2, -1 \; n = 0 \end{cases}$ |
| 8 | 4 | Non-Head Tail | $\lfloor sM_{sc}^{PUSCH}/8 \rfloor + n + k$ where $\begin{cases} s = 0 \text{ and } k = 0, 1, 2, 3 \; n = 0 \\ s = 1, 2, 3, 4, 5, 6 \text{ and } k = -2, -1, 0, 1 \; n = \lfloor M_{sc}^{PUSCH}/16 \rfloor \\ s = 8 \text{ and } k = -4, -3, -2, -1 \; n = 0 \end{cases}$ |

A UE 115-a communicating with a base station 105-a based on a symbol mapping table (e.g., Table 1) and an indicated reference symbol pattern (e.g., a reference signal pattern 210), or based on a symbol mapping table that includes reference signal patters (e.g., Table 2) may have improved link quality and data throughput.

In some examples, UE 115-a may operate in accordance with a number of communication modes. For example, base station 105-b may configure UE 115-a with a symbol mapping table that is similar to Table 1, but that includes additional information indicating reference signal patterns, and a communication mode may alter the reference signal patterns that are available to UE 115-a. For example, a row of the symbol mapping table may be associated with both a HT pattern and a Non-HT pattern, but a communication mode may indicate that the row may be associated with a HT pattern. In some additional or alternative modes, the symbol mapping table may not be associated with reference signal patterns. In other words, the mode (e.g., an initial access mode) may indicate a symbol mapping table that is a subset of the symbol mapping table that includes reference signal pattern information. In some cases, base station 105-a may signal to UE 115-a when UE 115-a requests more entries in the symbol mapping table than supported by the mode. Base station 105-*a* may reconfigure the symbol mapping table in an RRC procedure or a medium access control element (MAC-CE). In some modes (e.g., a narrowband initial access mode), UE 115-*a* may have initial access to base station 105-*a* in a narrow band, and UE 115-*a* may be later configured to use a larger bandwidth for data. A simplified symbol mapping table may be used during a first mode (e.g., a narrowband mode), and a more detailed symbol mapping table may be used during a second mode (e.g., wideband mode, a data mode, etc.). A wideband mode may support the efficient transmission of data between UE 115-*a* and base station 105-*b*, thereby improving data throughput.

Figure 3:
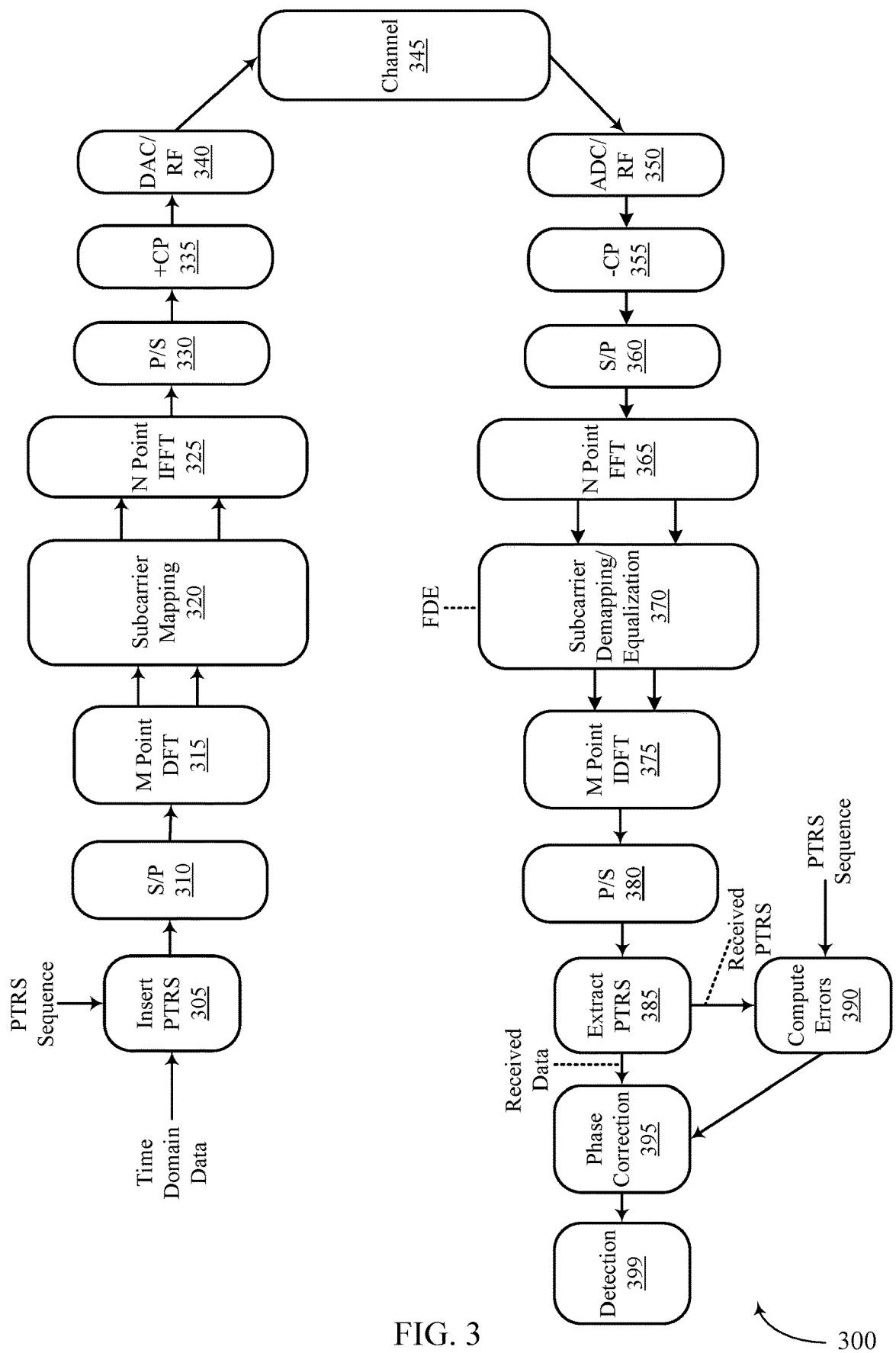
FIG. 3 illustrates an example of a time domain equalization (TDE) process flow that supports phase tracking reference signal pattern selection in accordance with aspects of the present disclosure.

FIG. 3 illustrates an example of an FDE process flow 300 that supports phase tracking reference signal pattern selection in accordance with aspects of the present disclosure. In some examples, the FDE process flow 300 may implement aspects of wireless communications system 100 and/or 200.

At 305, a reference signal sequence (e.g., a PTRS sequence)) may be inserted into time domain data. The symbols and reference signal sequence 310 may be processed at M Point DFT 315, and subcarrier mapping 320 may be performed. In some cases, a device may form a sequence by inserting PTRSs among data symbols at 305. The sequence may be based on mapping information (e.g., symbol mapping information 205 (including reference signal pattern 210-*a*, reference signal pattern 210-*b*, etc.) as described with reference to FIG. 2). N Point inverse fast Fourier transform (IFFT) 325 may process the data, and the data may traverse P/S 330, receive a cyclic prefix (CP) at 335, and be transmitted onto a channel 345 by DAC/RF 340.

The ADC/RF 350 may receive the data from the channel 345, a CP may be removed at 355, and the data may traverse S/P 360 where N point fast Fourier transform (FFT) 365 may be performed. Subcarrier demapping/equalization may be performed at 370. The data may be processed at M Point inverse DFT (IDFT) 375 and P/S 380. At 385, the reference signal may be extracted from the data, and errors may be computed at 390 based on an extracted reference signal and a known reference signal sequence. The reference signal may be extracted based on mapping information (e.g., symbol mapping information 205 (including reference signal pattern 210-*a*, reference signal pattern 210-*b*, etc.) as described with reference to FIG. 2). In some cases, the mapping information may be based on a device receiver type. In some cases, an identified mapping information may reduce the computation complexity for receiving a transmission. For example, mapping information may reduce errors computed at 390, which may reduce an amount of degree of phase correction performed at 395, thereby reducing computation complexity and increase device battery life. A phase correction may be applied to the received data at 395, and detection may occur at 399. The phase correction may reduce phase noise, thereby improving link quality.

Figure 4:
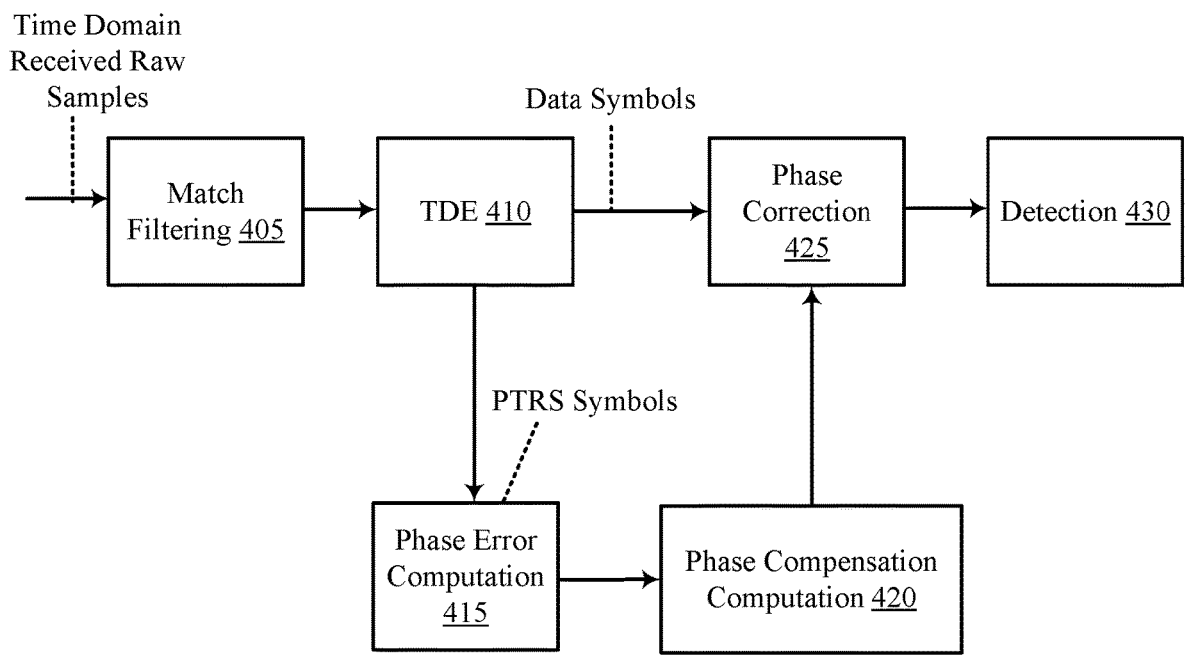
FIG. 4 illustrates an example of a frequency domain equalization (FDE) process flow that supports phase tracking reference signal pattern selection in accordance with aspects of the present disclosure.

FIG. 4 illustrates an example of a TDE process flow 400 that supports phase tracking reference signal pattern selection in accordance with aspects of the present disclosure. In some examples, the TDE process flow 400 may implement aspects of wireless communications system 100 and/or 200.

Time domain data (e.g., raw samples) may be received at a TDE receiver of a device, and the data may undergo match filtering at 405. At 410, TDE may be performed, and the TDE may be performed in data in a sequential manner. The data may contain reference signal symbols, and the device may perform a phase error computation at 415. In some examples, the data may contain reference signal symbols based on symbol mapping information, and the reference signal symbols may be extracted by the device based on the symbol mapping information. At 415, the extracted reference signal symbols may be compared to known reference signal symbols, and a phase error commutation may be performed at 415 to determine an amount of phase error present in the data. The device may perform a phase compensation computation at 420 and a phase correction at 425, and detection at 430. A lesser degree of phase error may be present in the data based on the reference signal symbol pattern of the data, which may reduce the amount of phase compensation computations performed at 420. Performing fewer phase compensation computations may reduce system latency and increase the battery life of the device. In some cases, processing data (e.g., data symbols) sequentially may improve the speed of phase error detection and correction, which may improve the link quality between a UE and a base station.

Figure 5:
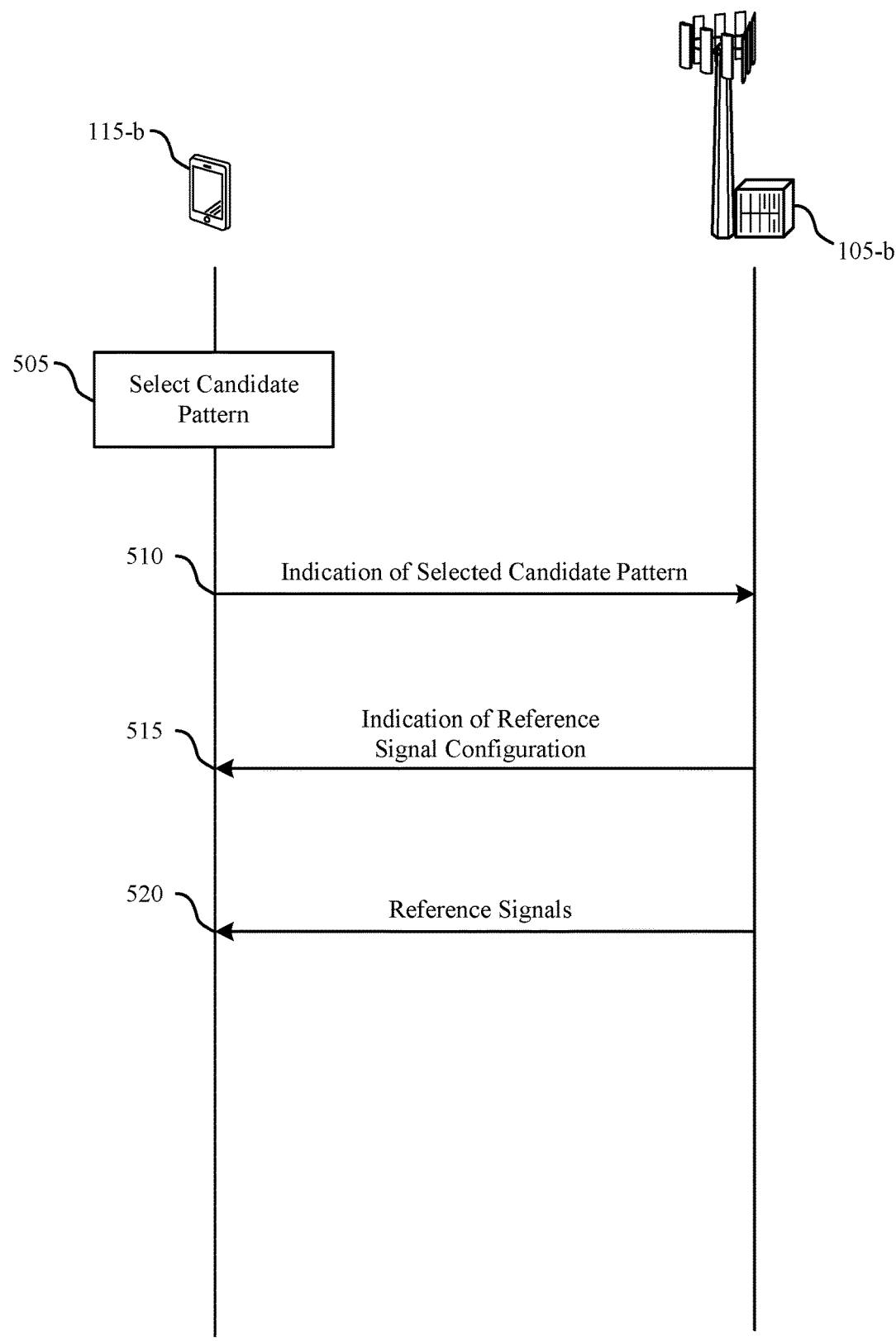
FIG. 5 illustrates an example of a process flow that supports phase tracking reference signal pattern selection in accordance with aspects of the present disclosure.

FIG. 5 illustrates an example of a process flow 500 that supports phase tracking reference signal pattern selection in accordance with aspects of the present disclosure. In some examples, the process flow 500 may implement aspects of wireless communications system 100. The process flow 500 includes UE 115-*b* and base station 105-*b* which may be examples of the corresponding devices described with reference to FIGS. 1 through 4. Alternative examples of the following may be implemented, where some steps are performed in a different order than described or are not performed at all. In some cases, steps may include additional features not mentioned below, or further steps may be added.

At 505, UE 115-*b* may select a candidate pattern from a set of patterns for reference signals used to track phase error. For example, UE 115-*b* may select a first pattern (e.g., a HT patter) or a second pattern (e.g., a Non-HT patter). The pattern may be selected based on a receiver type (e.g., a TDE receiver, an FDE receiver, etc.) or an amount of measured phase noise.

At 510, UE 115-*b* may transmit an indication of the selected pattern to base station 105-*b*. In some examples, UE 115-*b* may transmit the indication of the selected pattern via a number of parameters.

At 515, UE 115-*b* may receive an indication of a configuration for the reference signals used to track phase error from base station 105-*b*. The configuration may indicate a pattern of the set of patterns, a number of reference signal groups, and a number of samples per reference signal group.

At 520, UE 115-*b* may receive the reference signals used to track phase error according to the indicated configuration.

Figure 6:
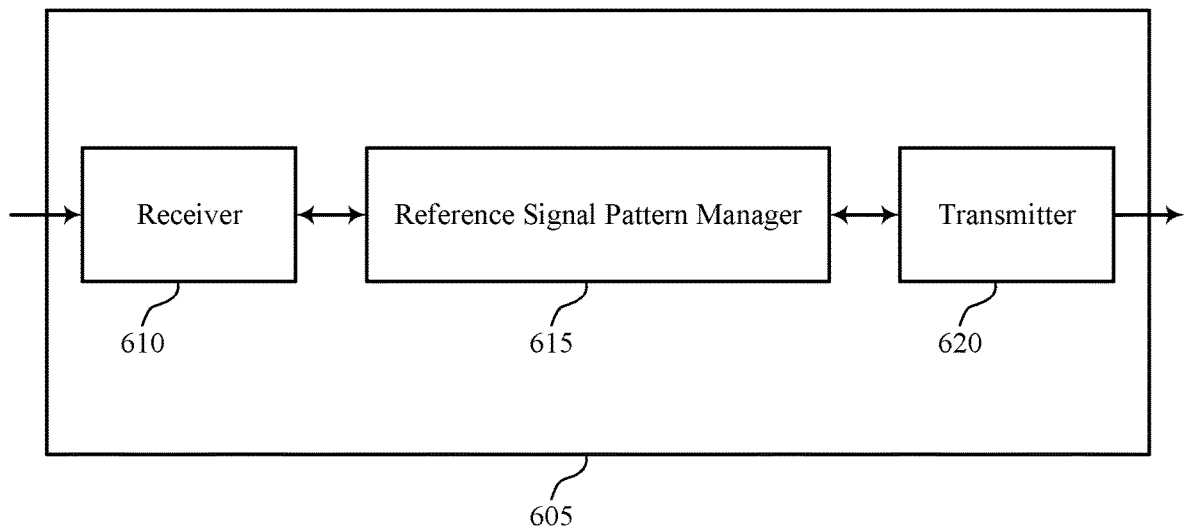
FIGS. 6 and 7 show block diagrams of devices that support phase tracking reference signal pattern selection in accordance with aspects of the present disclosure.

FIG. 6 shows a block diagram 600 of a device 605 that supports phase tracking reference signal pattern selection in accordance with aspects of the present disclosure. The device 605 may be an example of aspects of a UE 115 as described herein. The device 605 may include a receiver 610, a reference signal pattern manager 615, and a transmitter 620. The device 605 may also include one or more processors, memory coupled with the one or more processors, and instructions stored in the memory that are executable by the one or more processors to enable the one or more processors to perform the reference signal pattern selection features discussed herein. Each of these components may be in communication with one another (e.g., via one or more buses).

The receiver 610 may receive information such as packets, user data, or control information associated with various information channels (e.g., control channels, data channels, and information related to phase tracking reference signal pattern selection, etc.). Information may be passed on to other components of the device 605. The receiver 610 may be an example of aspects of the transceiver 920 described with reference to FIG. 9. The receiver 610 may utilize a single antenna or a set of antennas.

The reference signal pattern manager 615 may select a candidate pattern from a set of patterns for reference signals used to track phase error, transmit, to a base station, an indication of the selected pattern, receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group, and receive, according to the indicated configuration, the reference signals used to track phase error. The reference signal pattern manager 615 may be an example of aspects of the reference signal pattern manager 910 described herein.

The reference signal pattern manager 615, or its sub-components, may be implemented in hardware, code (e.g., software or firmware) executed by a processor, or any combination thereof. If implemented in code executed by a processor, the functions of the reference signal pattern manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The reference signal pattern manager 615, or its sub-components, may be physically located at various positions, including being distributed such that portions of functions are implemented at different physical locations by one or more physical components. In some examples, the reference signal pattern manager 615, or its sub-components, may be a separate and distinct component in accordance with various aspects of the present disclosure. In some examples, the reference signal pattern manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

By including or configuring the reference signal pattern manager 615 in accordance with examples as described herein, the device 605 (e.g., a processor controlling or otherwise coupled to the receiver 610, the transmitter 620, the reference signal pattern manager 615, or a combination thereof) may support techniques for increased spectral efficiency, higher reliability, higher data rates, and increased UE capability, among other examples.

Figure 7:
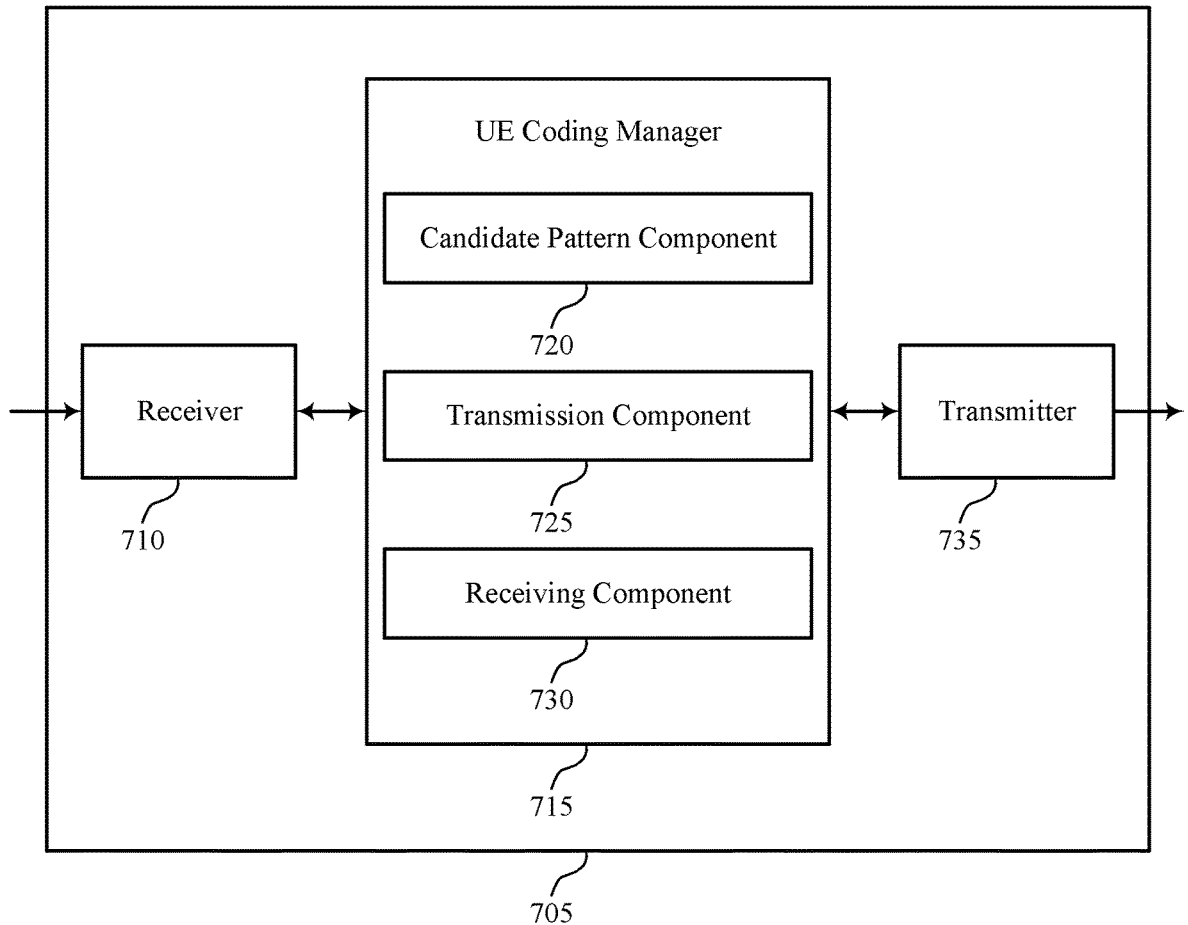

FIG. 7 shows a block diagram 700 of a device 705 that supports phase tracking reference signal pattern selection in accordance with aspects of the present disclosure. The device 705 may be an example of aspects of a device 605, or a UE 115 as described herein. The device 705 may include a receiver 710, a reference signal pattern manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to phase tracking reference signal pattern selection, etc.). Information may be passed on to other components of the device 705. The receiver 710 may be an example of aspects of the transceiver 920 described with reference to FIG. 9. The receiver 710 may utilize a single antenna or a set of antennas.

The reference signal pattern manager 715 may be an example of aspects of the reference signal pattern manager 615 as described herein. The reference signal pattern manager 715 may include a candidate pattern component 720, a transmission component 725, and a receiving component 730. The reference signal pattern manager 715 may be an example of aspects of the reference signal pattern manager 910 described herein.

The candidate pattern component 720 may select a candidate pattern from a set of patterns for reference signals used to track phase error.

The transmission component 725 may transmit, to a base station, an indication of the selected pattern.

The receiving component 730 may receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group and receive, according to the indicated configuration, the reference signals used to track phase error.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

In some cases, the candidate pattern component 720, the transmission component 725, and the receiving component 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the candidate pattern component 720, the transmission component 725, and the receiving component 730 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
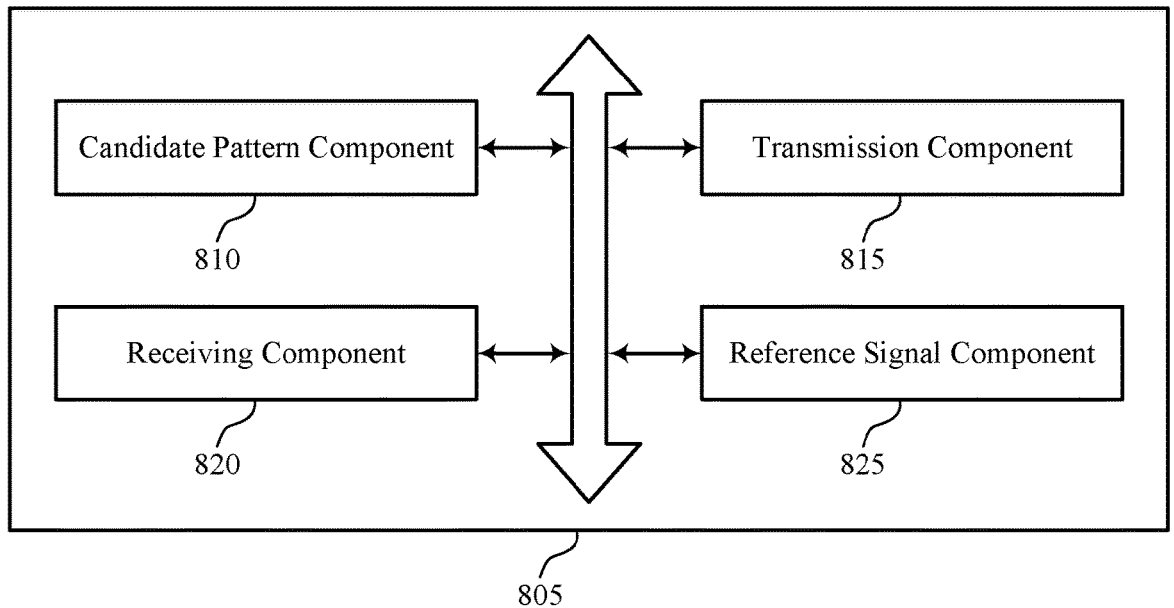
FIG. 8 shows a block diagram of a reference signal pattern manager that supports phase tracking reference signal pattern selection in accordance with aspects of the present disclosure.

FIG. 8 shows a block diagram 800 of a reference signal pattern manager 805 that supports phase tracking reference signal pattern selection in accordance with aspects of the present disclosure. The reference signal pattern manager 805 may be an example of aspects of a reference signal pattern manager 615, a reference signal pattern manager 715, or a reference signal pattern manager 910 described herein. The reference signal pattern manager 805 may include a candidate pattern component 810, a transmission component 815, a receiving component 820, and a reference signal component 825. Each of these modules may communicate, directly or indirectly, with one another (e.g., via one or more buses).

The candidate pattern component 810 may select a candidate pattern from a set of patterns for reference signals used to track phase error. In some examples, the candidate pattern component 810 may identify an equalizer including a frequency domain equalizer or a time domain equalizer. In some examples, the candidate pattern component 810 may select the candidate pattern based on the identified equalizer. In some examples, the candidate pattern component 810 may identify a receiver capability of the UE. In some examples, the candidate pattern component 810 may select the candidate pattern based on the identified receiver capability. In some examples, the candidate pattern component 810 may measure phase noise at the UE.

In some examples, the candidate pattern component 810 may select the candidate pattern based on the measured phase noise. In some examples, the candidate pattern component 810 may identify a receiver implementation of the UE. In some examples, the candidate pattern component 810 may select the candidate pattern based on the identified receiver implementation. In some cases, the first pattern includes a set of reference signal portions for the reference signals and at least one data portion, the set of reference signal portions bounding the at least one data portion in a time domain.

In some cases, the second pattern includes a set of data portions and at least one reference signal portion for the reference signals, the set of data portions bounding the at least one reference signal portion in the time domain.

In some cases, the first pattern and the second pattern both include at least one of the same number of reference signal samples, or the same number of reference signal groups, or the same number of samples per group.

In some cases, the candidate pattern includes a first pattern and the equalizer includes a time domain equalizer, where the first pattern includes a set of reference signal portions for the reference signals and at least one data portion, the set of reference signal portions bounding the at least one data portion in a time domain.

In some cases, the candidate pattern includes a second pattern and the equalizer includes a frequency domain equalizer, where the second pattern includes a set of data portions and at least one reference signal portion for the reference signals, the set of data portions bounding the at least one reference signal portion in a time domain. The transmission component 815 may transmit, to a base station, an indication of the selected pattern. In some examples, the transmission component 815 may identify a receiver capability of the UE.

In some examples, the transmission component 815 may transmit, to the base station, an indication of the receiver capability of the UE, where the indication of the configuration is received from the base station at least in part in response to the transmitted indication of the receiver capability. In some examples, the transmission component 815 may perform a transmission over a radio frequency spectrum band. In some examples, the transmission component 815 may measure a phase error of the transmission based on the indication of the configuration for the reference signals used to track phase error.

The receiving component 820 may receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group. In some examples, the receiving component 820 may receive, according to the indicated configuration, the reference signals used to track phase error. The reference signal component 825 may identify a mode of operation for the UE.

In some examples, the reference signal component 825 may identify a first set of configurations for the reference signals used to track phase error corresponding to a first mode of operation and a second set of configurations for the reference signals used to track phase error corresponding to a second mode of operation different than the first mode of operation. In some examples, the reference signal component 825 may determine one of the first set of configurations or the second set of configurations corresponding to the identified mode of operation for the UE.

In some examples, the reference signal component 825 may determine the configuration for the reference signal used to track phase error based on the received indication of the configuration and the determined one of the first set of configurations or the second set of configurations. In some examples, the reference signal component 825 may receive, from the base station, the first set of configurations corresponding to the first mode of operation and the second set of configurations corresponding to the second mode of operation.

In some cases, the indication of the configuration for the reference signals used to track phase error indicates a table entry that identifies the pattern of the set of patterns, the number of reference signal groups, and the number of samples per reference signal group.

In some cases, the indication of the configuration for the reference signals used to track phase error indicates the pattern of the set of patterns, and indicates a table entry that identifies the number of reference signal groups and the number of samples per reference signal group.

In some cases, the first mode of operation corresponds to a relatively lower radio frequency spectrum band than the second mode of operation. In some cases, the first mode of operation corresponds to an initial access procedure using a first bandwidth. In some cases, the second mode of operation corresponds to procedures following the initial access procedure using a second bandwidth narrower than the first bandwidth.

In some cases, the candidate pattern component 810, transmission component 815, the receiving component 820, and the reference signal component 825 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the candidate pattern component 810, transmission component 815, the receiving component 820, and the reference signal component 825 discussed herein.

Figure 9:
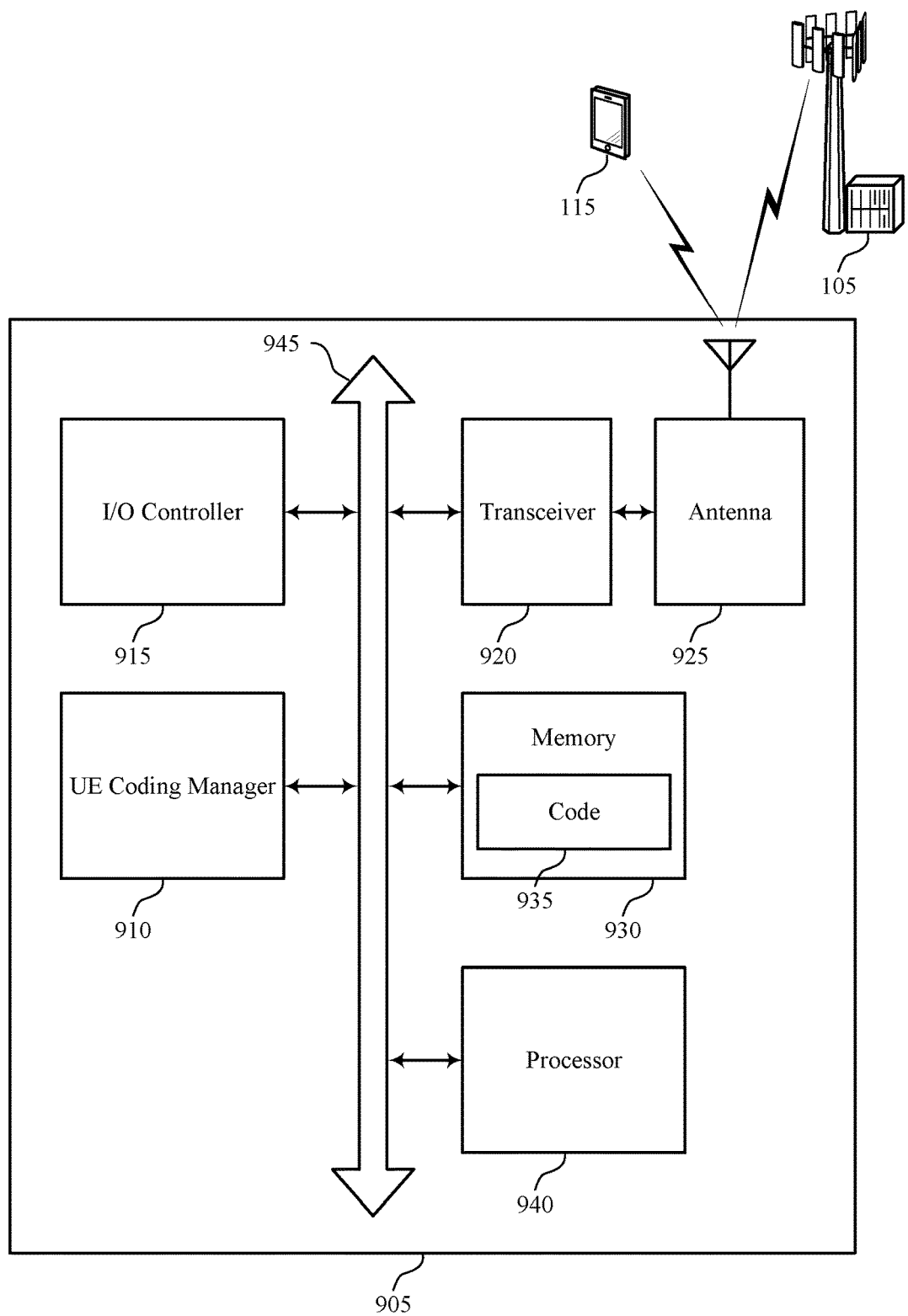
FIG. 9 shows a diagram of a system including a device that supports phase tracking reference signal pattern selection in accordance with aspects of the present disclosure.

FIG. 9 shows a diagram of a system 900 including a device 905 that supports phase tracking reference signal pattern selection in accordance with aspects of the present disclosure. The device 905 may be an example of or include the components of device 605, device 705, or a UE 115 as described herein. The device 905 may include components for bi-directional voice and data communications including components for transmitting and receiving communications, including a reference signal pattern manager 910, an I/O controller 915, a transceiver 920, an antenna 925, memory 930, and a processor 940. These components may be in electronic communication via one or more buses (e.g., bus 945).

The reference signal pattern manager 910 may select a candidate pattern from a set of patterns for reference signals used to track phase error, transmit, to a base station, an indication of the selected pattern, receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group, and receive, according to the indicated configuration, the reference signals used to track phase error.

By including or configuring the reference signal pattern manager 910 in accordance with examples as described herein, the device 905 may support techniques for improved communication reliability, improved user experience related to reliability, and more efficient utilization of communication resources among other examples.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting phase tracking reference signal pattern selection).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
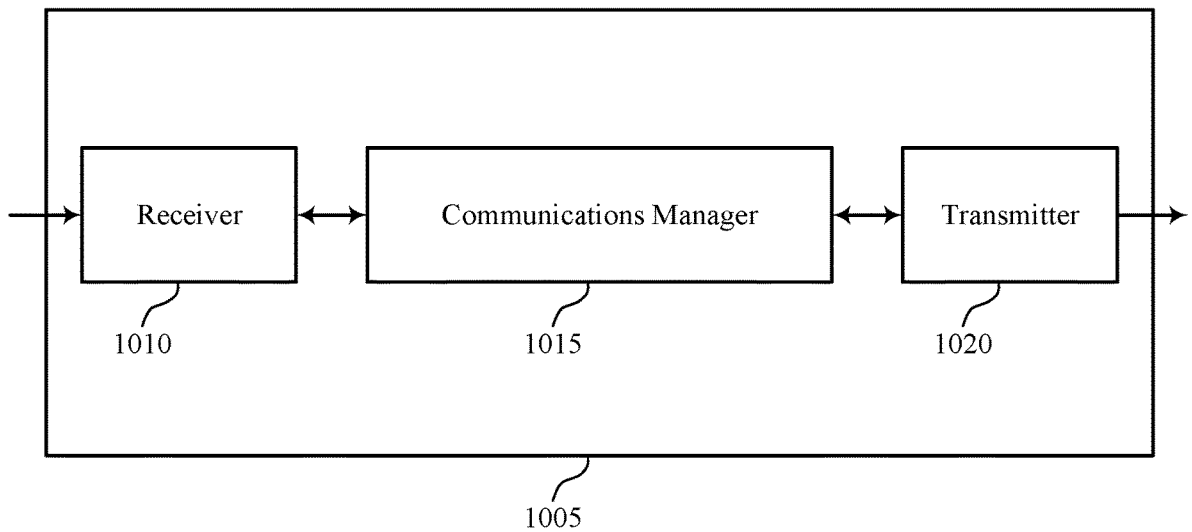
FIGS. 10 and 11 show block diagrams of devices that support phase tracking reference signal pattern selection in accordance with aspects of the present disclosure.

FIG. 10 shows a block diagram 1000 of a device 1005 that supports phase tracking reference signal pattern selection in accordance with aspects of the present disclosure. The device 1005 may be an example of aspects of a base station 105 as described herein. The device 1005 may include a receiver 1010, a communications manager 1015, and a transmitter 1020. The device 1005 may also include one or more processors, memory coupled with the one or more processors, and instructions stored in the memory that are executable by the one or more processors to enable the one or more processors to perform the reference signal pattern selection features discussed herein. Each of these components may be in communication with one another (e.g., via one or more buses).

The receiver 1010 may receive information such as packets, user data, or control information associated with various information channels (e.g., control channels, data channels, and information related to phase tracking reference signal pattern selection, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, an indication of a candidate reference signal pattern, the candidate reference signal pattern indicating one of a set of patterns for reference signals used to track phase error, determine, based on the indicated candidate reference signal pattern, a configuration for the reference signals used to track phase error, the configuration indicating a pattern of a set of patterns, a number of reference signal groups, and a number of samples per reference signal group, transmit, to the UE, an indication of the configuration, and transmit, according to the indicated configuration, the reference signals used to track phase error. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

By including or configuring the communications manager 1015 in accordance with examples as described herein, the device 1005 (e.g., a processor controlling or otherwise coupled to the receiver 1010, the transmitter 1020, the communications manager 1015, or a combination thereof) may support techniques for increased spectral efficiency, higher reliability, higher data rates, and increased UE capability, among other examples.

Figure 11:
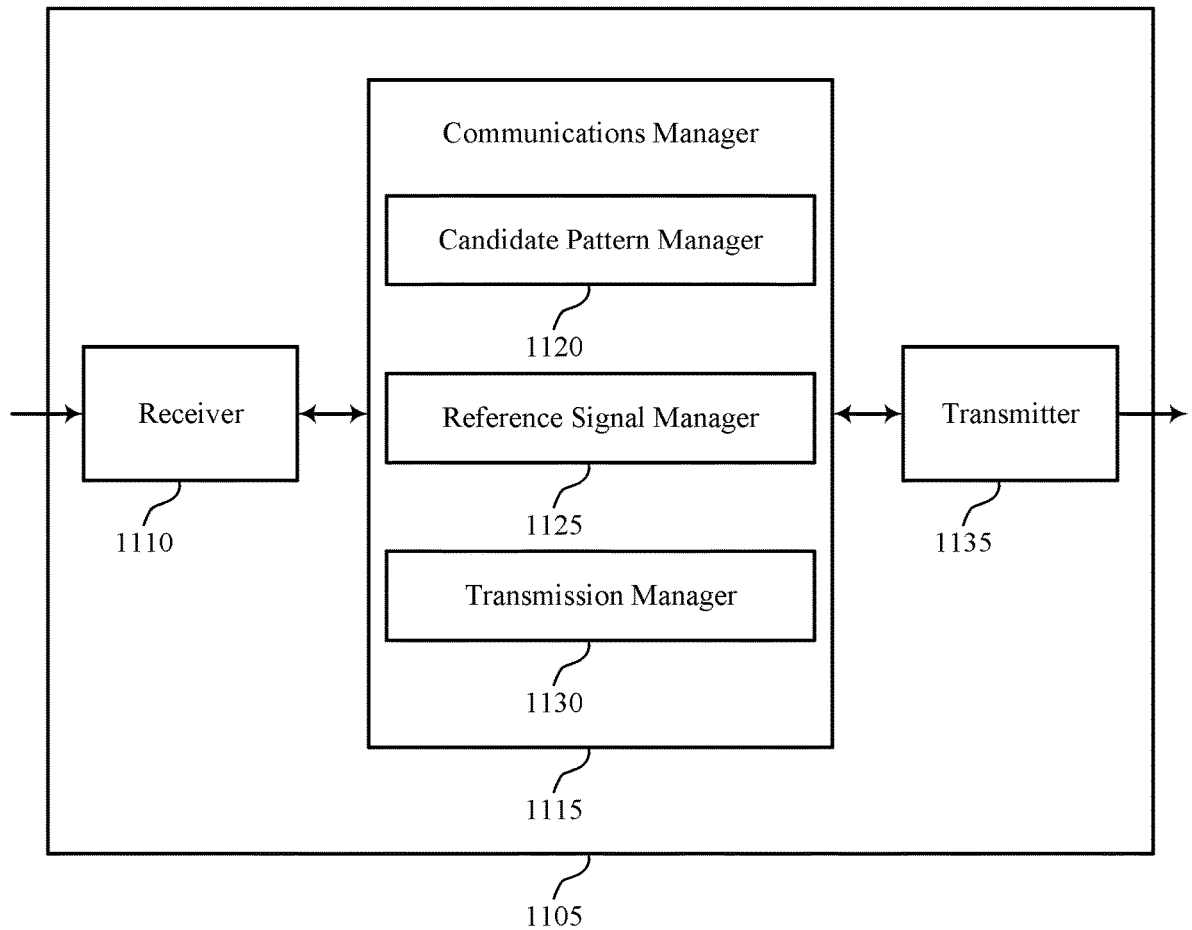

FIG. 11 shows a block diagram 1100 of a device 1105 that supports phase tracking reference signal pattern selection in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to phase tracking reference signal pattern selection, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a candidate pattern manager 1120, a reference signal manager 1125, and a transmission manager 1130. The communications manager 1115 may be an example of aspects of the communications manager 1310 described herein.

The candidate pattern manager 1120 may receive, from a UE, an indication of a candidate reference signal pattern, the candidate reference signal pattern indicating one of a set of patterns for reference signals used to track phase error.

The reference signal manager 1125 may determine, based on the indicated candidate reference signal pattern, a configuration for the reference signals used to track phase error, the configuration indicating a pattern of a set of patterns, a number of reference signal groups, and a number of samples per reference signal group.

The transmission manager 1130 may transmit, to the UE, an indication of the configuration and transmit, according to the indicated configuration, the reference signals used to track phase error.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

In some cases, the candidate pattern manager 1120, the reference signal manager 1125, and the transmission manager 1130 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the candidate pattern manager 1120, the reference signal manager 1125, and the transmission manager 1130 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
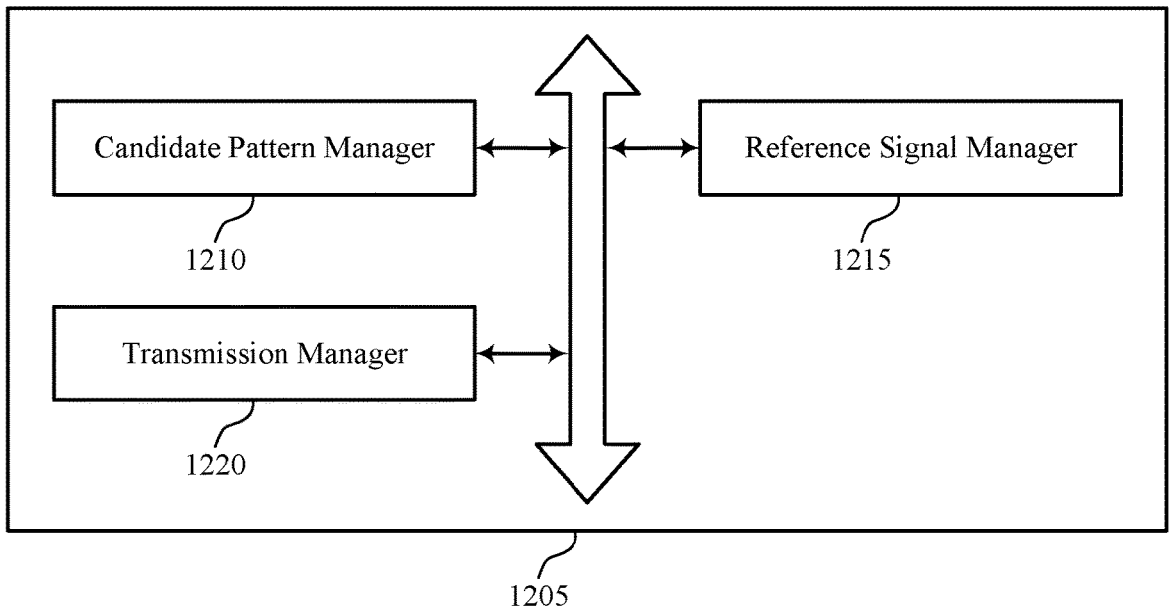
FIG. 12 shows a block diagram of a reference signal pattern manager that supports phase tracking reference signal pattern selection in accordance with aspects of the present disclosure.

FIG. 12 shows a block diagram 1200 of a reference signal pattern manager 1205 that supports phase tracking reference signal pattern selection in accordance with aspects of the present disclosure. The reference signal pattern manager 1205 may be an example of aspects of a communications manager 1015, a communications manager 1115, or a communications manager 1310 described herein. The reference signal pattern manager 1205 may include a candidate pattern manager 1210, a reference signal manager 1215, and a transmission manager 1220. Each of these modules may communicate, directly or indirectly, with one another (e.g., via one or more buses).

The candidate pattern manager 1210 may receive, from a UE, an indication of a candidate reference signal pattern, the candidate reference signal pattern indicating one of a set of patterns for reference signals used to track phase error.

In some cases, the first pattern includes a set of reference signal portions for the reference signals and at least one data portion, the set of reference signal portions bounding the at least one data portion in a time domain. In some cases, the second pattern includes a set of data portions and at least one reference signal portion for the reference signals, the set of data portions bounding the at least one reference signal portion in the time domain.

In some cases, the set of patterns includes at least a first pattern and a second pattern, where the first pattern and the second pattern both include at least one of the same number of reference signal samples, or the same number of reference signal groups, or the same number of samples per group.

In some cases, the candidate reference signal pattern is based on an equalizer, where the equalizer includes a frequency domain equalizer or a time domain equalizer. In some cases, the candidate reference signal pattern includes a first pattern and the equalizer includes a time domain equalizer, where the first pattern includes a set of reference signal portions for the reference signals and at least one data portion, the set of reference signal portions bounding the at least one data portion in a time domain.

In some cases, the candidate reference signal pattern includes a second pattern and the equalizer includes a frequency domain equalizer, where the second pattern includes a set of data portions and at least one reference signal portion for the reference signals, the set of data portions bounding the at least one reference signal portion in a time domain.

The reference signal manager 1215 may determine, based on the indicated candidate reference signal pattern, a configuration for the reference signals used to track phase error, the configuration indicating a pattern of a set of patterns, a number of reference signal groups, and a number of samples per reference signal group. In some examples, the reference signal manager 1215 may receive an indication of a receiver capability of the UE.

In some examples, the reference signal manager 1215 may transmit the indication of the configuration to the UE based on the received indication of the receiver capability. In some examples, the reference signal manager 1215 may transmit, to the UE, a first set of configurations corresponding to a first mode of operation for the UE and a second set of configurations corresponding to a second mode of operation for the UE. In some cases, the configuration for the reference signals used to track phase error indicates a table entry that identifies the pattern of the set of patterns, the number of reference signal groups, and the number of samples per reference signal group.

In some cases, the configuration for the reference signals used to track phase error indicates the pattern of the set of patterns, and indicates a table entry that identifies the number of reference signal groups and the number of samples per reference signal group. In some cases, the first mode of operation corresponds to a relatively lower radio frequency spectrum band than the second mode of operation. In some cases, the first mode of operation corresponds to an initial access procedure using a first bandwidth.

In some cases, the second mode of operation corresponds to procedures following the initial access procedure using a second bandwidth narrower than the first bandwidth. The transmission manager 1220 may transmit, to the UE, an indication of the configuration. In some examples, the transmission manager 1220 may transmit, according to the indicated configuration, the reference signals used to track phase error.

In some cases, the candidate pattern manager 1210, the reference signal manager 1215, and the transmission manager 1220 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the candidate pattern manager 1210, the reference signal manager 1215, and the transmission manager 1220 discussed herein.

Figure 13:
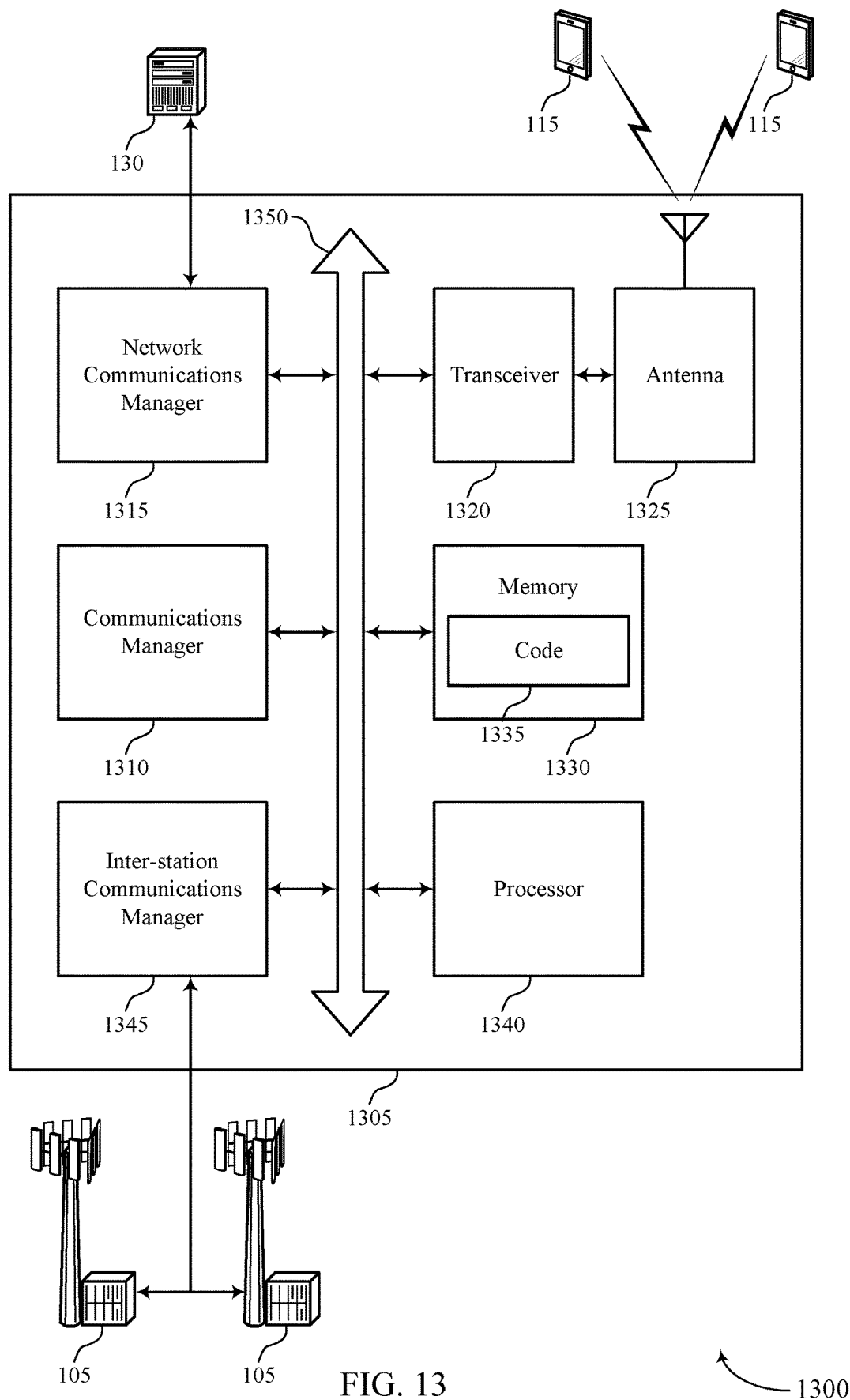
FIG. 13 shows a diagram of a system including a device that supports phase tracking reference signal pattern selection in accordance with aspects of the present disclosure.

FIG. 13 shows a diagram of a system 1300 including a device 1305 that supports phase tracking reference signal pattern selection in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, an indication of a candidate reference signal pattern, the candidate reference signal pattern indicating one of a set of patterns for reference signals used to track phase error, determine, based on the indicated candidate reference signal pattern, a configuration for the reference signals used to track phase error, the configuration indicating a pattern of a set of patterns, a number of reference signal groups, and a number of samples per reference signal group, transmit, to the UE, an indication of the configuration, and transmit, according to the indicated configuration, the reference signals used to track phase error.

By including or configuring the communications manager 1310 in accordance with examples as described herein, the device 1305 may support techniques for improved communication reliability, improved user experience related to reliability, and more efficient utilization of communication resources among other examples.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting phase tracking reference signal pattern selection).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
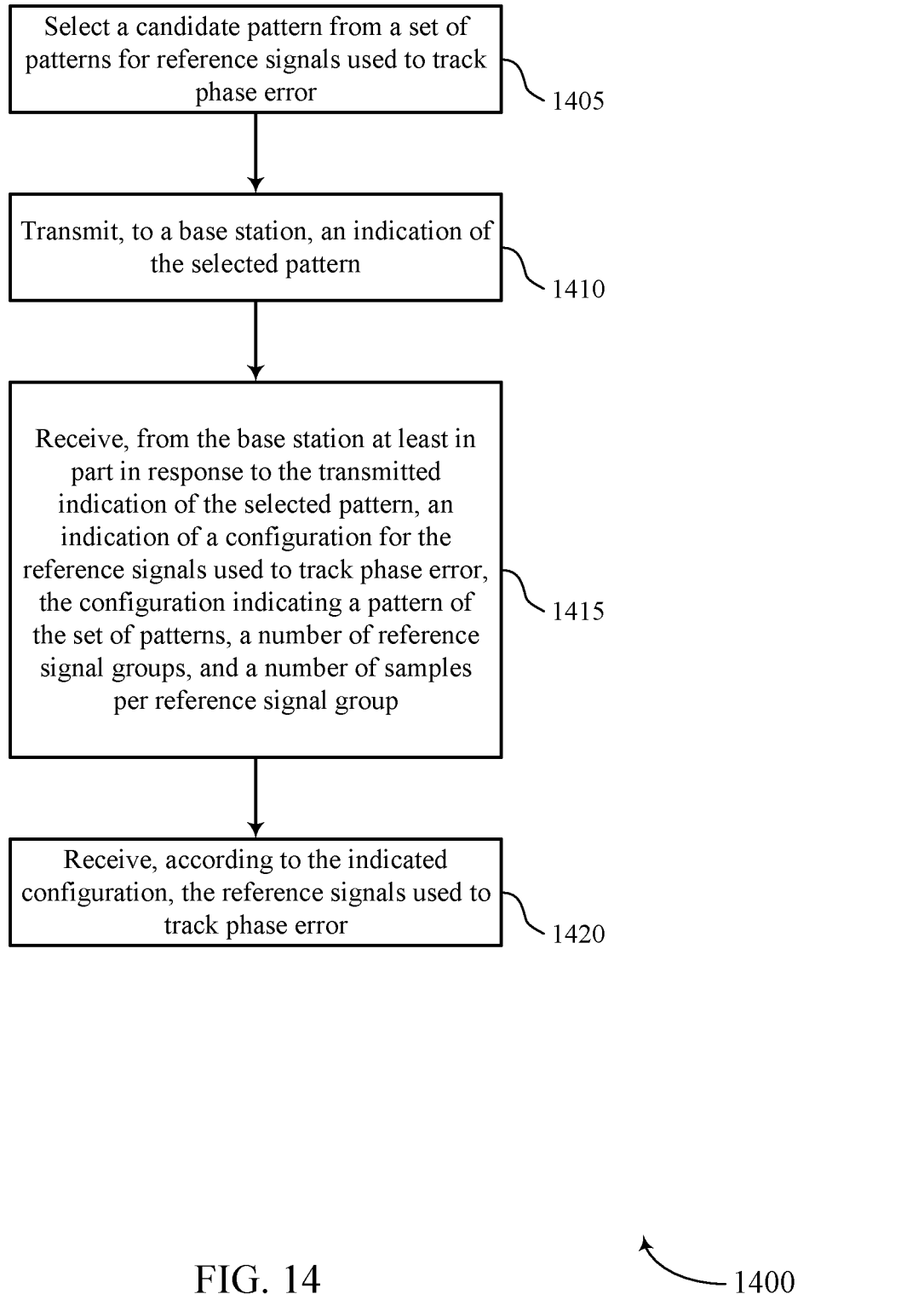
FIGS. 14 through 17 show flowcharts illustrating methods that support phase tracking reference signal pattern selection in accordance with aspects of the present disclosure.

FIG. 14 shows a flowchart illustrating a method 1400 that supports phase tracking reference signal pattern selection in accordance with aspects of the present disclosure. The operations of method 1400 may be implemented by a UE 115 or its components as described herein. For example, the operations of method 1400 may be performed by a reference signal pattern manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may select a candidate pattern from a set of patterns for reference signals used to track phase error. The operations of 1405 may be performed according to the methods described herein. In some examples, aspects of the operations of 1405 may be performed by a candidate pattern component as described with reference to FIGS. 6 through 9.

At 1410, the UE may transmit, to a base station, an indication of the selected pattern. The operations of 1410 may be performed according to the methods described herein. In some examples, aspects of the operations of 1410 may be performed by a transmission component as described with reference to FIGS. 6 through 9.

At 1415, the UE may receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group. The operations of 1415 may be performed according to the methods described herein. In some examples, aspects of the operations of 1415 may be performed by a receiving component as described with reference to FIGS. 6 through 9.

At 1420, the UE may receive, according to the indicated configuration, the reference signals used to track phase error. The operations of 1420 may be performed according to the methods described herein. In some examples, aspects of the operations of 1420 may be performed by a receiving component as described with reference to FIGS. 6 through 9.

Figure 15:
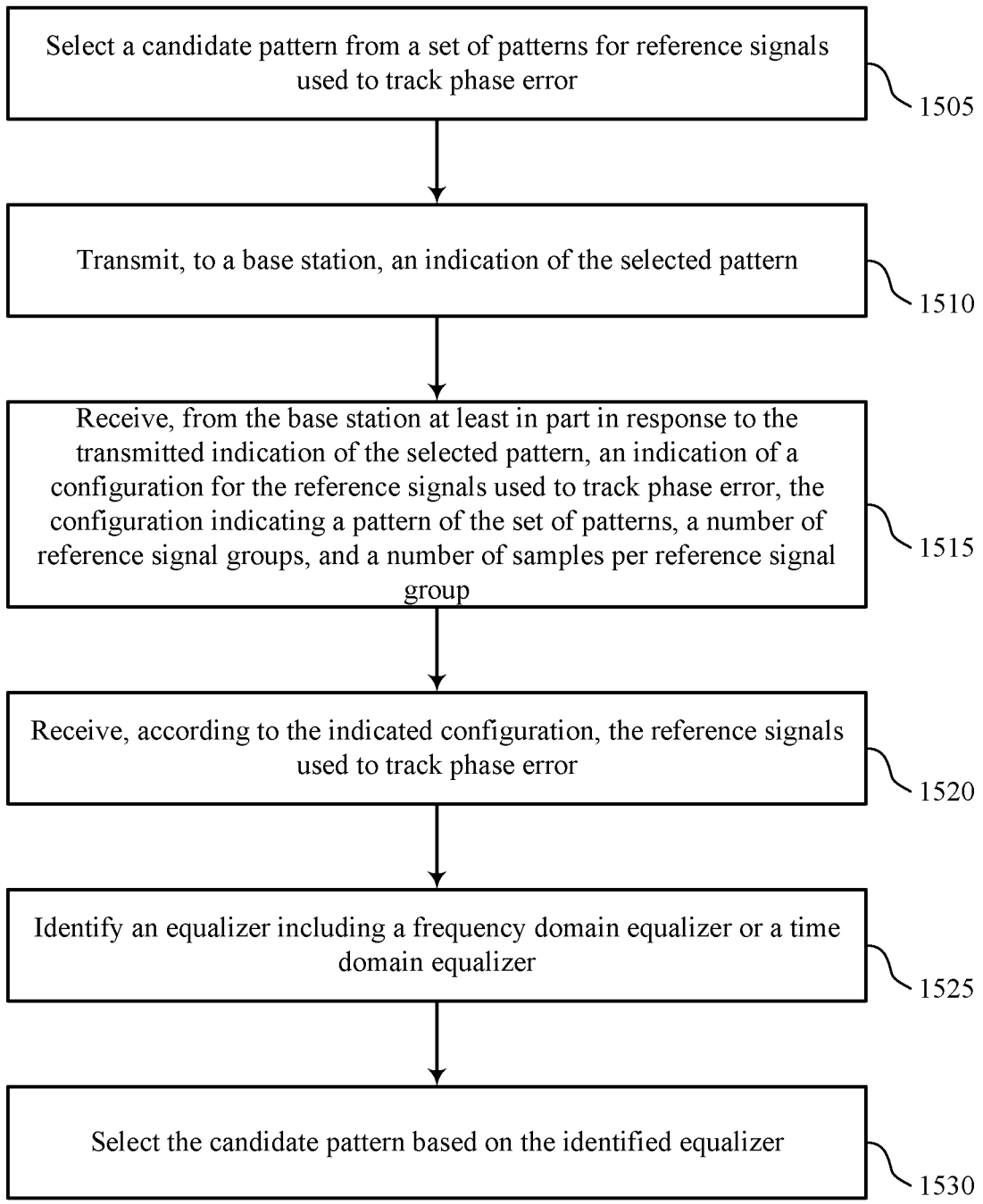

FIG. 15 shows a flowchart illustrating a method 1500 that supports phase tracking reference signal pattern selection in accordance with aspects of the present disclosure. The operations of method 1500 may be implemented by a UE 115 or its components as described herein. For example, the operations of method 1500 may be performed by a reference signal pattern manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may select a candidate pattern from a set of patterns for reference signals used to track phase error. The operations of 1505 may be performed according to the methods described herein. In some examples, aspects of the operations of 1505 may be performed by a candidate pattern component as described with reference to FIGS. 6 through 9.

At 1510, the UE may transmit, to a base station, an indication of the selected pattern. The operations of 1510 may be performed according to the methods described herein. In some examples, aspects of the operations of 1510 may be performed by a transmission component as described with reference to FIGS. 6 through 9.

At 1515, the UE may receive, from the base station at least in part in response to the transmitted indication of the selected pattern, an indication of a configuration for the reference signals used to track phase error, the configuration indicating a pattern of the set of patterns, a number of reference signal groups, and a number of samples per reference signal group. The operations of 1515 may be performed according to the methods described herein. In some examples, aspects of the operations of 1515 may be performed by a receiving component as described with reference to FIGS. 6 through 9.

At 1520, the UE may receive, according to the indicated configuration, the reference signals used to track phase error. The operations of 1520 may be performed according to the methods described herein. In some examples, aspects of the operations of 1520 may be performed by a receiving component as described with reference to FIGS. 6 through 9.

At 1525, the UE may identify an equalizer including a frequency domain equalizer or a time domain equalizer. The operations of 1525 may be performed according to the methods described herein. In some examples, aspects of the operations of 1525 may be performed by a candidate pattern component as described with reference to FIGS. 6 through 9.

At 1530, the UE may select the candidate pattern based on the identified equalizer. The operations of 1530 may be performed according to the methods described herein. In some examples, aspects of the operations of 1530 may be performed by a candidate pattern component as described with reference to FIGS. 6 through 9.

Figure 16:
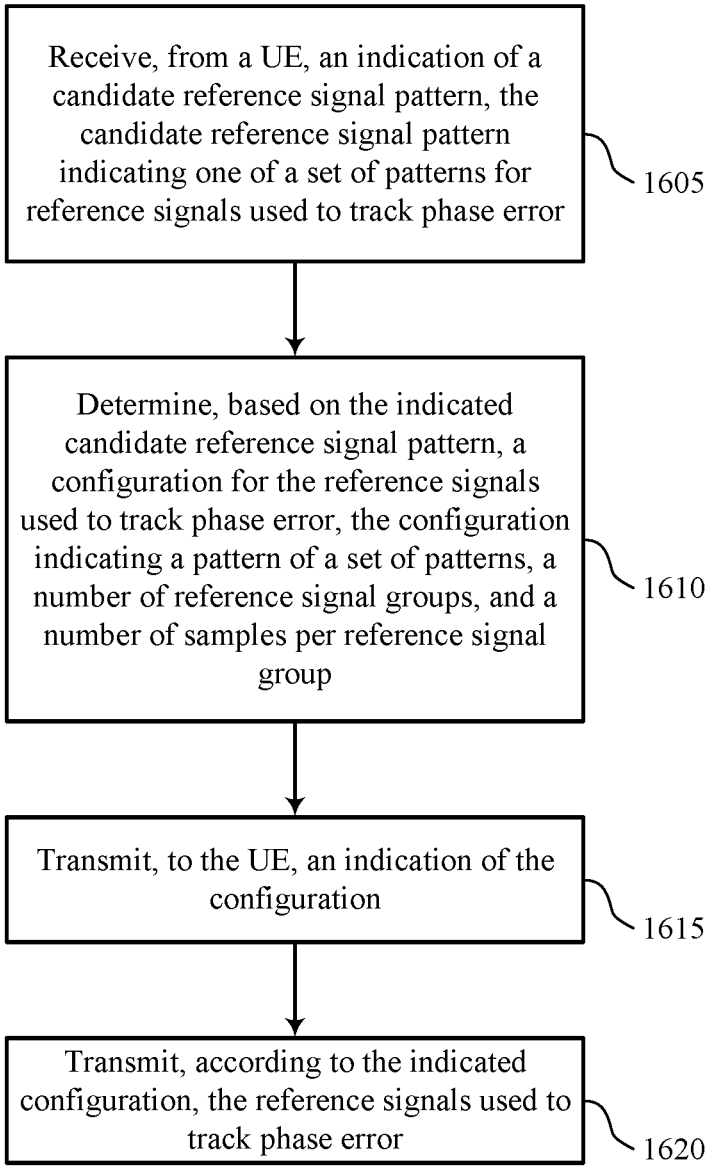

FIG. 16 shows a flowchart illustrating a method 1600 that supports phase tracking reference signal pattern selection in accordance with aspects of the present disclosure. The operations of method 1600 may be implemented by a base station 105 or its components as described herein. For example, the operations of method 1600 may be performed by a reference signal pattern manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may receive, from a UE, an indication of a candidate reference signal pattern, the candidate reference signal pattern indicating one of a set of patterns for reference signals used to track phase error. The operations of 1605 may be performed according to the methods described herein. In some examples, aspects of the operations of 1605 may be performed by a candidate pattern manager as described with reference to FIGS. 10 through 13.

At 1610, the base station may determine, based on the indicated candidate reference signal pattern, a configuration for the reference signals used to track phase error, the configuration indicating a pattern of a set of patterns, a number of reference signal groups, and a number of samples per reference signal group. The operations of 1610 may be performed according to the methods described herein. In some examples, aspects of the operations of 1610 may be performed by a reference signal manager as described with reference to FIGS. 10 through 13.

At 1615, the base station may transmit, to the UE, an indication of the configuration. The operations of 1615 may be performed according to the methods described herein. In some examples, aspects of the operations of 1615 may be performed by a transmission manager as described with reference to FIGS. 10 through 13.

At 1620, the base station may transmit, according to the indicated configuration, the reference signals used to track phase error. The operations of 1620 may be performed according to the methods described herein. In some examples, aspects of the operations of 1620 may be performed by a transmission manager as described with reference to FIGS. 10 through 13.

Figure 17:
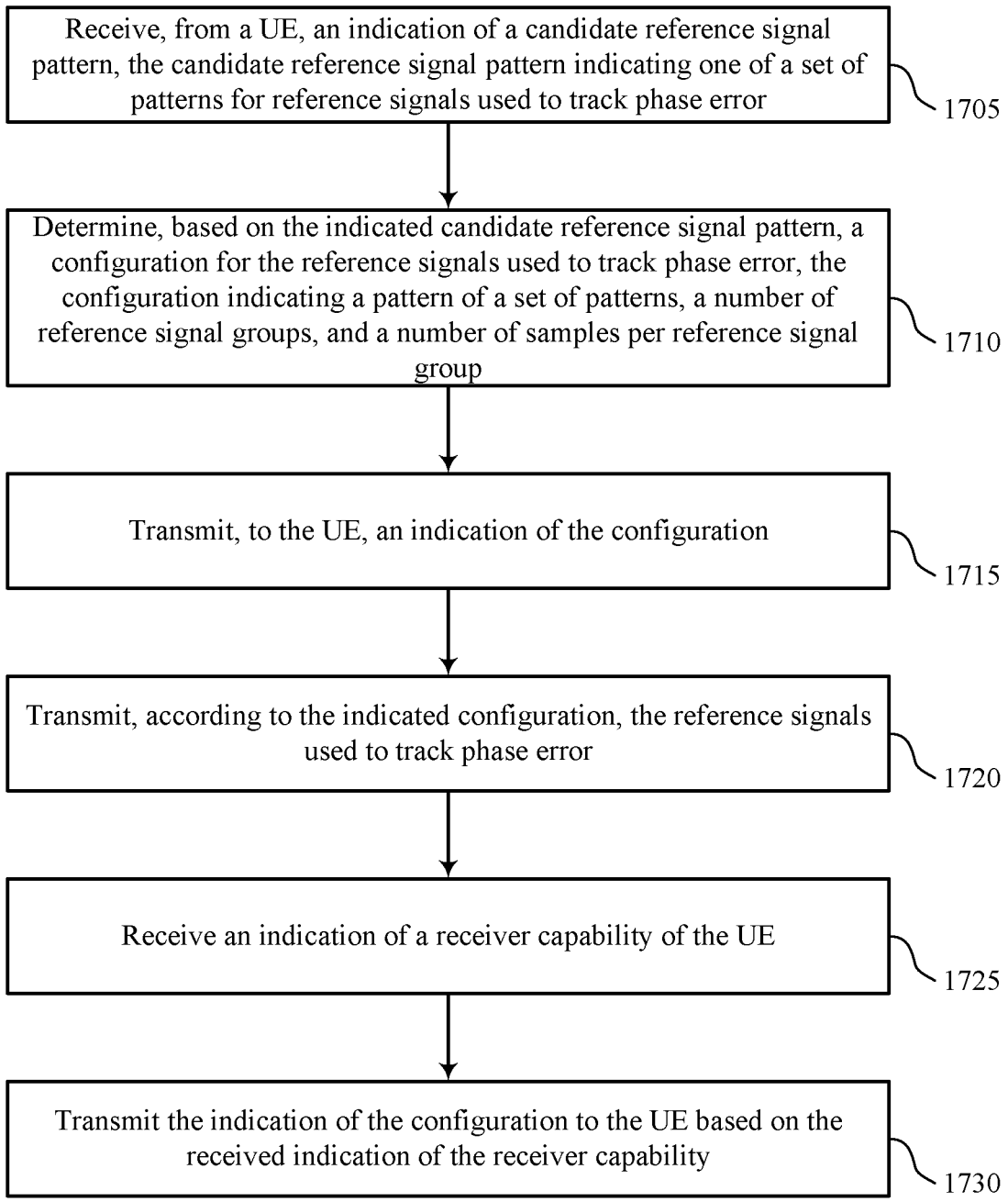

FIG. 17 shows a flowchart illustrating a method 1700 that supports phase tracking reference signal pattern selection in accordance with aspects of the present disclosure. The operations of method 1700 may be implemented by a base station 105 or its components as described herein. For example, the operations of method 1700 may be performed by a reference signal pattern manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may receive, from a UE, an indication of a candidate reference signal pattern, the candidate reference signal pattern indicating one of a set of patterns for reference signals used to track phase error. The operations of 1705 may be performed according to the methods described herein. In some examples, aspects of the operations of 1705 may be performed by a candidate pattern manager as described with reference to FIGS. 10 through 13.

At 1710, the base station may determine, based on the indicated candidate reference signal pattern, a configuration for the reference signals used to track phase error, the configuration indicating a pattern of a set of patterns, a number of reference signal groups, and a number of samples per reference signal group. The operations of 1710 may be performed according to the methods described herein. In some examples, aspects of the operations of 1710 may be performed by a reference signal manager as described with reference to FIGS. 10 through 13.

At 1715, the base station may transmit, to the UE, an indication of the configuration. The operations of 1715 may be performed according to the methods described herein. In some examples, aspects of the operations of 1715 may be performed by a transmission manager as described with reference to FIGS. 10 through 13.

At 1720, the base station may transmit, according to the indicated configuration, the reference signals used to track phase error. The operations of 1720 may be performed according to the methods described herein. In some examples, aspects of the operations of 1720 may be performed by a transmission manager as described with reference to FIGS. 10 through 13.

At 1725, the base station may receive an indication of a receiver capability of the UE. The operations of 1725 may be performed according to the methods described herein. In some examples, aspects of the operations of 1725 may be performed by a reference signal manager as described with reference to FIGS. 10 through 13.

At 1730, the base station may transmit the indication of the configuration to the UE based on the received indication of the receiver capability. The operations of 1730 may be performed according to the methods described herein. In some examples, aspects of the operations of 1730 may be performed by a reference signal manager as described with reference to FIGS. 10 through 13.

The following provides an overview of aspects of the present disclosure:

Aspect 1: A method for wireless communication at a UE, comprising: selecting a candidate pattern from a set of patterns for reference signals used to track phase error; transmitting, to a base station, an indication of the selected pattern; receiving, from the base station at least in part in response to the transmitted indication of the selected pattern, an indication of a configuration for the reference signals used to track phase error, the configuration indicating a pattern of the set of patterns, a number of reference signal groups, and a number of samples per reference signal group; and receiving, according to the indicated configuration, the reference signals used to track phase error.

Aspect 2: The method of aspect 1, wherein the set of patterns comprises at least a first pattern and a second pattern, wherein: the first pattern comprises a plurality of reference signal portions for the reference signals and at least one data portion, the plurality of reference signal portions bounding the at least one data portion in a time domain; and the second pattern comprises a plurality of data portions and at least one reference signal portion for the reference signals, the plurality of data portions bounding the at least one reference signal portion in the time domain.

Aspect 3: The method of aspect 2, wherein the first pattern and the second pattern both comprise at least one of the same number of reference signal samples, or the same number of reference signal groups, or the same number of samples per group.

Aspect 4: The method of any of aspects 1 through 3, wherein selecting the candidate pattern further comprises: identifying an equalizer comprising a frequency domain equalizer or a time domain equalizer; and selecting the candidate pattern based at least in part on the identified equalizer.

Aspect 5: The method of aspect 4, wherein the candidate pattern comprises a second pattern and the equalizer comprises the frequency domain equalizer, the second pattern comprises a plurality of data portions and at least one reference signal portion for the reference signals, the plurality of data portions bounding the at least one reference signal portion in a time domain.

Aspect 6: The method of any of aspects 1 through 5, wherein the indication of the configuration for the reference signals used to track phase error indicates a table entry that identifies the pattern of the set of patterns, the number of reference signal groups, and the number of samples per reference signal group.

Aspect 7: The method of any of aspects 1 through 6, wherein the indication of the configuration for the reference signals used to track phase error indicates the pattern of the set of patterns, and indicates a table entry that identifies the number of reference signal groups and the number of samples per reference signal group.

Aspect 8: The method of any of aspects 1 through 7, further comprising: identifying a receiver capability of the UE; and selecting the candidate pattern based at least in part on the identified receiver capability.

Aspect 9: The method of any of aspects 1 through 8, further comprising: identifying a receiver capability of the UE; and transmitting, to the base station, an indication of the receiver capability of the UE, wherein the indication of the configuration is received from the base station at least in part in response to the transmitted indication of the receiver capability.

Aspect 10: The method of any of aspects 1 through 9, further comprising: identifying a receiver implementation of the UE; selecting the candidate pattern based at least in part on the identified receiver implementation, wherein selecting the candidate pattern further comprises: measuring phase noise at the UE; and selecting the candidate pattern based at least in part on the measured phase noise.

Aspect 11: The method of any of aspects 1 through 10, further comprising: performing a transmission over a radio frequency spectrum band; and measuring a phase error of the transmission based at least in part on the indication of the configuration for the reference signals used to track phase error.

Aspect 12: The method of any of aspects 1 through 11, further comprising: identifying a mode of operation for the UE; identifying a first set of configurations for the reference signals used to track phase error corresponding to a first mode of operation and a second set of configurations for the reference signals used to track phase error corresponding to a second mode of operation different than the first mode of operation; determining one of the first set of configurations or the second set of configurations corresponding to the identified mode of operation for the UE; and determining the configuration for the reference signal used to track phase error based at least in part on the received indication of the configuration and the determined one of the first set of configurations or the second set of configurations.

Aspect 13: The method of aspect 12, further comprising: receiving, from the base station, the first set of configurations corresponding to the first mode of operation and the second set of configurations corresponding to the second mode of operation.

Aspect 14: The method of any of aspects 12 through 13, wherein the first mode of operation corresponds to an initial access procedure using a first bandwidth; and the second mode of operation corresponds to procedures following the initial access procedure using a second bandwidth narrower than the first bandwidth.

Aspect 15: The method of claim 0 wherein the candidate pattern comprises a first pattern and the equalizer comprises the time domain equalizer, the first pattern comprises a plurality of reference signal portions for the reference signals and at least one data portion, the plurality of reference signal portions bounding the at least one data portion in a time domain.

Aspect 16: A method for wireless communication at a base station, comprising: receiving, from a UE, an indication of a candidate reference signal pattern, the candidate reference signal pattern indicating one of a set of patterns for reference signals used to track phase error; determining, based at least in part on the indicated candidate reference signal pattern, a configuration for the reference signals used to track phase error, the configuration indicating a pattern of the set of patterns, a number of reference signal groups, and a number of samples per reference signal group; transmitting, to the UE, an indication of the configuration; and transmitting, according to the indicated configuration, the reference signals used to track phase error.

Aspect 17: The method of aspect 16, wherein the set of patterns comprises at least a first pattern and a second pattern, wherein: the first pattern comprises a plurality of reference signal portions for the reference signals and at least one data portion, the plurality of reference signal portions bounding the at least one data portion in a time domain; and the second pattern comprises a plurality of data portions and at least one reference signal portion for the reference signals, the plurality of data portions bounding the at least one reference signal portion in the time domain.

Aspect 18: The method of any of aspects 16 through 17, wherein the set of patterns comprises at least a first pattern and a second pattern, the first pattern and the second pattern both comprise at least one of the same number of reference signal samples, or the same number of reference signal groups, or the same number of samples per group.

Aspect 19: The method of any of aspects 16 through 18, wherein the candidate reference signal pattern is based at least in part on an equalizer, the equalizer comprises a frequency domain equalizer or a time domain equalizer.

Aspect 20: The method of aspect 19, wherein the candidate reference signal pattern comprises a first pattern and the equalizer comprises the time domain equalizer, the first pattern comprises a plurality of reference signal portions for the reference signals and at least one data portion, the plurality of reference signal portions bounding the at least one data portion in a time domain.

Aspect 21: The method of any of aspects 19 through 20, wherein the candidate reference signal pattern comprises a second pattern and the equalizer comprises the frequency domain equalizer, the second pattern comprises a plurality of data portions and at least one reference signal portion for the reference signals, the plurality of data portions bounding the at least one reference signal portion in a time domain.

Aspect 22: The method of any of aspects 16 through 21, wherein the configuration for the reference signals used to track phase error indicates a table entry that identifies the pattern of the set of patterns, the number of reference signal groups, and the number of samples per reference signal group.

Aspect 23: The method of any of aspects 16 through 22, wherein the configuration for the reference signals used to track phase error indicates the pattern of the set of patterns, and indicates a table entry that identifies the number of reference signal groups and the number of samples per reference signal group.

Aspect 24: The method of any of aspects 16 through 23, further comprising: receiving an indication of a receiver capability of the UE; and transmitting the indication of the configuration to the UE based at least in part on the received indication of the receiver capability.

Aspect 25: The method of any of aspects 16 through 24, further comprising: transmitting, to the UE, a first set of configurations corresponding to a first mode of operation for the UE and a second set of configurations corresponding to a second mode of operation for the UE.

Aspect 26: The method of aspect 25, wherein the first mode of operation corresponds to an initial access procedure using a first bandwidth; and the second mode of operation corresponds to procedures following the initial access procedure using a second bandwidth narrower than the first bandwidth.

Aspect 27: An apparatus for wireless communication at a UE, comprising a processor; memory coupled with the processor; and instructions stored in the memory and executable by the processor to cause the apparatus to perform a method of any of aspects 1 through 14.

Aspect 28: An apparatus for wireless communication at a UE, comprising at least one means for performing a method of any of aspects 1 through 14.

Aspect 29: A non-transitory computer-readable medium storing code for wireless communication at a UE, the code comprising instructions executable by a processor to perform a method of any of aspects 1 through 14.

Aspect 30: An apparatus comprising a processor; memory coupled with the processor; and instructions stored in the memory and executable by the processor to cause the apparatus to perform a method of any of aspects 15 through 15.

Aspect 31: An apparatus comprising at least one means for performing a method of any of aspects 15 through 15.

Aspect 32: A non-transitory computer-readable medium storing code the code comprising instructions executable by a processor to perform a method of any of aspects 15 through 15.

Aspect 33: An apparatus for wireless communication at a base station, comprising a processor; memory coupled with the processor; and instructions stored in the memory and executable by the processor to cause the apparatus to perform a method of any of aspects 16 through 26.

Aspect 34: An apparatus for wireless communication at a base station, comprising at least one means for performing a method of any of aspects 16 through 26.

Aspect 35: A non-transitory computer-readable medium storing code for wireless communication at a base station, the code comprising instructions executable by a processor to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   selecting, based at least in part on a type of an equalizer at the UE, a candidate pattern from a set of patterns for reference signals associated with phase error tracking, wherein the set of patterns for reference signals comprises a first pattern associated with a time domain equalizer and a second pattern associated with a frequency domain equalizer;
   transmitting, to a base station, an indication of the selected candidate pattern;
   receiving, from the base station at least in part in response to the transmitted indication of the selected candidate pattern, an indication of a configuration for the reference signals associated with phase error tracking, the configuration indicating a pattern of the set of patterns, a number of reference signal groups, and a number of samples per reference signal group; and
   receiving, according to the indicated configuration, the reference signals associated with phase error tracking.

2. The method of claim 1, wherein:
   the first pattern comprises at least one data portion and a plurality of reference signal portions for the reference signals, the plurality of reference signal portions bounding the at least one data portion in a time domain; and
   the second pattern comprises a plurality of data portions and at least one reference signal portion for the reference signals, the plurality of data portions bounding the at least one reference signal portion in the time domain.

3. The method of claim 2, wherein the first pattern and the second pattern both comprise at least one of a same number of reference signal samples, or a same number of reference signal groups, or a same number of samples per group.

4. The method of claim 1, wherein the candidate pattern comprises the first pattern and the equalizer comprises the time domain equalizer, and wherein the first pattern comprises at least one data portion and a plurality of reference signal portions for the reference signals, the plurality of reference signal portions bounding the at least one data portion in a time domain.

5. The method of claim 1, wherein the candidate pattern comprises the second pattern and the equalizer comprises the frequency domain equalizer, and wherein the second pattern comprises a plurality of data portions and at least one reference signal portion for the reference signals, the plurality of data portions bounding the at least one reference signal portion in a time domain.

6. The method of claim 1, wherein the indication of the configuration for the reference signals associated with phase error tracking indicates a table entry that identifies the pattern of the set of patterns, the number of reference signal groups, and the number of samples per reference signal group.

7. The method of claim 1, wherein the indication of the configuration for the reference signals associated with phase error tracking indicates the pattern of the set of patterns and indicates a table entry that identifies both the number of reference signal groups and the number of samples per reference signal group.

8. The method of claim 1, wherein the candidate pattern is further selected based at least in part on a receiver capability of the UE.

9. The method of claim 1, further comprising:
   transmitting, to the base station, an indication of a receiver capability of the UE, wherein the indication of the configuration is received from the base station at least in part in response to the transmitted indication of the receiver capability.

10. The method of claim 1, further comprising:
    selecting the candidate pattern based at least in part on a receiver implementation of the UE, wherein selecting the candidate pattern comprises:
    measuring phase noise at the UE; and
    selecting the candidate pattern based at least in part on the measured phase noise.

11. The method of claim 1, further comprising:
    performing a transmission over a radio frequency spectrum band; and
    measuring a phase error of the transmission based at least in part on the indication of the configuration for the reference signals associated with phase error tracking.

12. The method of claim 1, further comprising:
    identifying a mode of operation for the UE;
    identifying a first set of configurations for the reference signals associated with phase error tracking, the first set of configurations corresponding to a first mode of operation, and further identifying a second set of configurations for the reference signals associated with phase error tracking, the second set of configurations corresponding to a second mode of operation different than the first mode of operation;
    determining one of the first set of configurations or the second set of configurations corresponding to the identified mode of operation for the UE; and
    determining the configuration for the reference signals associated with phase error tracking based at least in part on the received indication of the configuration and the determined one of the first set of configurations or the second set of configurations.

13. The method of claim 12, further comprising:
    receiving, from the base station, the first set of configurations corresponding to the first mode of operation and the second set of configurations corresponding to the second mode of operation.

14. The method of claim 12, wherein:
the first mode of operation corresponds to an initial access procedure using a first bandwidth; and
the second mode of operation corresponds to procedures following the initial access procedure using a second bandwidth narrower than the first bandwidth.

15. A method for wireless communication at a base station, comprising:
receiving, from a user equipment (UE) and based at least in part on a type of an equalizer at the UE, an indication of a candidate reference signal pattern, the candidate reference signal pattern indicating one of a set of patterns for reference signals associated with phase error tracking, wherein the set of patterns for reference signals comprises a first pattern associated with a time domain equalizer and a second pattern associated with a frequency domain equalizer;
transmitting, to the UE and based at least in part on the indicated candidate reference signal pattern, an indication of a configuration for the reference signals associated with phase error tracking, the configuration indicating a pattern of the set of patterns, a number of reference signal groups, and a number of samples per reference signal group; and
transmitting, according to the indicated configuration, the reference signals associated with phase error tracking.

16. The method of claim 15, wherein:
the first pattern comprises at least one data portion and a plurality of reference signal portions for the reference signals, the plurality of reference signal portions bounding the at least one data portion in a time domain; and
the second pattern comprises a plurality of data portions and at least one reference signal portion for the reference signals, the plurality of data portions bounding the at least one reference signal portion in the time domain.

17. The method of claim 15, wherein the set of patterns comprises at least the first pattern and the second pattern, wherein the first pattern and the second pattern both comprise at least one of a same number of reference signal samples, or a same number of reference signal groups, or a same number of samples per group.

18. The method of claim 15, wherein the candidate reference signal pattern is based at least in part on the equalizer, wherein the equalizer comprises the frequency domain equalizer or the time domain equalizer.

19. The method of claim 18, wherein the candidate reference signal pattern comprises the first pattern and the equalizer comprises the time domain equalizer, wherein the first pattern comprises at least one data portion and a plurality of reference signal portions for the reference signals, the plurality of reference signal portions bounding the at least one data portion in a time domain.

20. The method of claim 18, wherein the candidate reference signal pattern comprises the second pattern and the equalizer comprises the frequency domain equalizer, and wherein the second pattern comprises a plurality of data portions and at least one reference signal portion for the reference signals, the plurality of data portions bounding the at least one reference signal portion in a time domain.

21. The method of claim 15, wherein the configuration for the reference signals associated with phase error tracking indicates a table entry that identifies the pattern of the set of patterns, the number of reference signal groups, and the number of samples per reference signal group.

22. The method of claim 15, wherein the configuration for the reference signals associated with phase error tracking indicates the pattern of the set of patterns and indicates a table entry that identifies both the number of reference signal groups and the number of samples per reference signal group.

23. The method of claim 15, further comprising:
receiving an indication of a receiver capability of the UE; and
transmitting the indication of the configuration to the UE based at least in part on the received indication of the receiver capability.

24. The method of claim 15, further comprising:
transmitting, to the UE, a first set of configurations corresponding to a first mode of operation for the UE and a second set of configurations corresponding to a second mode of operation for the UE.

25. The method of claim 24, wherein:
the first mode of operation corresponds to an initial access procedure using a first bandwidth; and
the second mode of operation corresponds to procedures following the initial access procedure using a second bandwidth narrower than the first bandwidth.

26. A user equipment (UE) for wireless communications, comprising:
memory; and
one or more processors coupled with the memory and configured to cause the UE to:
select, based at least in part on a type of an equalizer at the UE, a candidate pattern from a set of patterns for reference signals associated with phase error tracking, wherein the set of patterns for reference signals comprises a first pattern associated with a time domain equalizer and a second pattern associated with a frequency domain equalizer;
transmit, to a base station, an indication of the selected candidate pattern;
receive, from the base station at least in part in response to the transmitted indication of the selected candidate pattern, an indication of a configuration for the reference signals associated with phase error tracking, the configuration indicating a pattern of the set of patterns, a number of reference signal groups, and a number of samples per reference signal group; and
receive, according to the indicated configuration, the reference signals associated with phase error tracking.

27. The UE of claim 26, wherein:
the first pattern comprises at least one data portion and a plurality of reference signal portions for the reference signals, the plurality of reference signal portions bounding the at least one data portion in a time domain; and
the second pattern comprises a plurality of data portions and at least one reference signal portion for the reference signals, the plurality of data portions bounding the at least one reference signal portion in the time domain.

28. The UE of claim 27, wherein the first pattern and the second pattern both comprise at least one of a same number of reference signal samples, or a same number of reference signal groups, or a same number of samples per group.

29. A base station for wireless communications, comprising:
memory; and
one or more processors coupled with the memory and configured to cause the base station to:
receive, from a user equipment (UE) and based at least in part on a type of an equalizer at the UE, an indication of a candidate reference signal pattern, the candidate reference signal pattern indicating one of a set of patterns for reference signals associated with phase error tracking, wherein the set of patterns for reference signals comprises a first pattern associated with a time domain equalizer and a second pattern associated with a frequency domain equalizer;

transmit, to the UE and based at least in part on the indicated candidate reference signal pattern, an indication of a configuration for the reference signals associated with phase error tracking, the configuration indicating a pattern of the set of patterns, a number of reference signal groups, and a number of samples per reference signal group; and transmit, according to the indicated configuration, the reference signals associated with phase error tracking.

* * * * *